United States Patent [19]

Kato

[11] Patent Number: 5,229,705
[45] Date of Patent: Jul. 20, 1993

[54] METHOD AND APPARATUS FOR CHARGING A NICKEL-CADMIUM BATTERY

[75] Inventor: Tadashi Kato, Chiba, Japan
[73] Assignee: Nippon Densan Corporation, Kyoto, Japan
[21] Appl. No.: 738,099
[22] Filed: Jul. 30, 1991
[30] Foreign Application Priority Data

Jul. 31, 1990 [JP] Japan .................................. 2-203072
Jul. 31, 1990 [JP] Japan .................................. 2-203073
Jul. 31, 1990 [JP] Japan .................................. 2-203074

[51] Int. Cl.$^5$ .............................................. H02J 7/04
[52] U.S. Cl. .......................................... 320/20; 320/40
[58] Field of Search .................. 320/6, 15, 17, 18, 20, 320/22, 23, 24, 31, 32, 39, 40, 25, 26

[56] References Cited

U.S. PATENT DOCUMENTS

| | | | |
|---|---|---|---|
| 4,639,655 | 1/1987 | Westhaver et al. | 320/20 X |
| 4,779,035 | 10/1988 | Engelmann | 320/20 X |
| 4,806,840 | 2/1989 | Alexander et al. | 320/20 |

*Primary Examiner*—Steven L. Stephan
*Assistant Examiner*—Kristine Peckman
*Attorney, Agent, or Firm*—McCormick, Paulding & Huber

[57] ABSTRACT

A charging control circuit having a controller including a microcomputer, a charging circuit, detectors for detecting the voltages between the terminals of batteries, and memories for storing charge control data. The controller determines that quick charging is completed when the voltage between the terminals of each battery drops from a peak value to an extent corresponding to a predetermined value stored in the memory, and then terminates the charging operation. During a predetermined period of insensible time immediately after the start of charging stored in the memory, the controller does not detect the voltage to determine whether or not each battery is fully charged, thereby preventing an error in determining a fully charged state of the battery. If a full charge of each battery is not detected while quick charging is continued for a certain period of time stored in the memory, the controller forcibly terminates the quickly charging operation. Desired data is selected from the control data stored in the memories in response to an external signal, and the charge control is optimized according to the number of batteries and other factors.

3 Claims, 22 Drawing Sheets

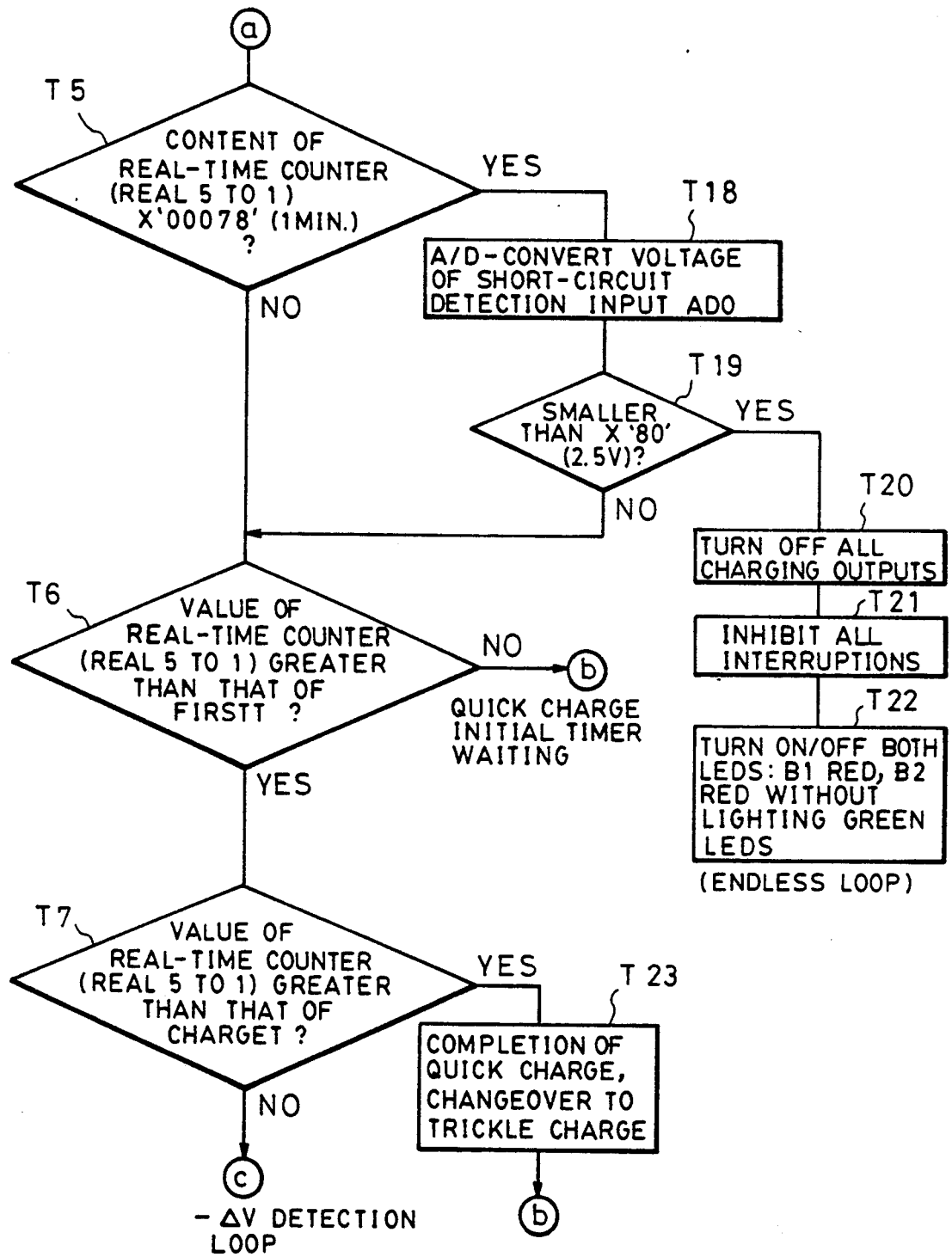
FIG. 9 (2)

METHOD AND APPARATUS FOR CHARGING A NICKEL-CADMIUM BATTERY

BACKGROUND OF THE INVENTION

This invention relates to charging of a battery and, more particularly, to a microcomputer type battery charging controller using a microcomputer.

A battery such as a Ni-Cd battery is repeatedly used by being recharged. The battery in a discharged state is quickly charged from a direct current power source. When a fully-charged state is detected, the charging operation is changed over from quick charging to trickle charging. The battery is used again after being charged to a predetermined extent.

Recently, systems for charging a plurality of batteries have been used. Conventionally, necessary apparatuses provided separately from each other are combined to form this kind of system. In such a case, however, the number of component parts and the manufacture cost are increased and the size of the system is also increased.

To cope with this problem, a method of incorporating a microcomputer in a charging apparatus and controlling charging operations with the microcomputer has been practiced.

Properties of a battery are generally determined by materials of the battery. For example, Ni-Cd batteries have an electromotive force of about 1.2 V per unit cell and exhibit stable characteristics irrespective of the amount of remaining charge. With respect to batteries formed of the same materials, however, the number of cells connected in series and the current capacity vary greatly. For example, the number of cells connected in series generally ranges from 2 to 10.

Batteries varying in number of cells and current capacity are on the market and are used according to use. Various battery packs formed of a plurality of batteries combined are also used presently.

In a case where batteries varying greatly in charge current capacity are charged with a direct current power source at a constant current capacity, the differences between the charging characteristics of the batteries representing the changes in the voltage between the terminals with respect to charging time are substantially large. That is, one direct current power source can be used for a plurality of batteries of the same voltage, but the charging time varies with respect to different current capacities. However, the conventional microcomputer-controlled battery charging apparatuses are designed for a constant preset control.

Ordinarily, a battery is fully charged by detecting the absolute value of the voltage between its terminals and a reduction in voltage ($-\Delta V$) after formation of a peak. If these voltage values are set with a constant accuracy of, for example, 100 mV, fully-charged states are detected with largely different accuracies with respect to, for example, a two-cell battery and a ten-cell battery.

The conventional microcomputer-controlled battery charging apparatuses perform charging control under a constant predetermined condition.

Consequently, in the conventional charging system, the charging operation is not always performed in a suitable manner with respect to different types of batteries.

SUMMARY OF THE INVENTION

It is an object of the present invention to provide a charging controller capable of controlling charging operations in a suitable manner no matter what the type of battery.

To achieve this object, according to the present invention, there is provided a charging controller designed to be used by being combined with a battery charging direct current power source to charge batteries, the charging controller including a microcomputer having a CPU for arithmetic operations, a ROM for storing a program, and a RAM for temporary storage. The program includes a main routine for controlling the charging process and a timer interruption routine for checking the state of the batteries. The RAM includes an area in which information is saved at the time of timer interruption, and another area in which data detected in the timer interruption routine is stored.

In the process of controlling charging of batteries, the state of each battery is checked by timer interruption to constantly monitor the latest condition of the battery which is variable, thereby optimizing the control.

The result of detection effected by timer interruption is stored in the RAM, and this information is read out in the main routine to enable effective control.

DESCRIPTION OF THE PREFERRED EMBODIMENT

Figure 1:
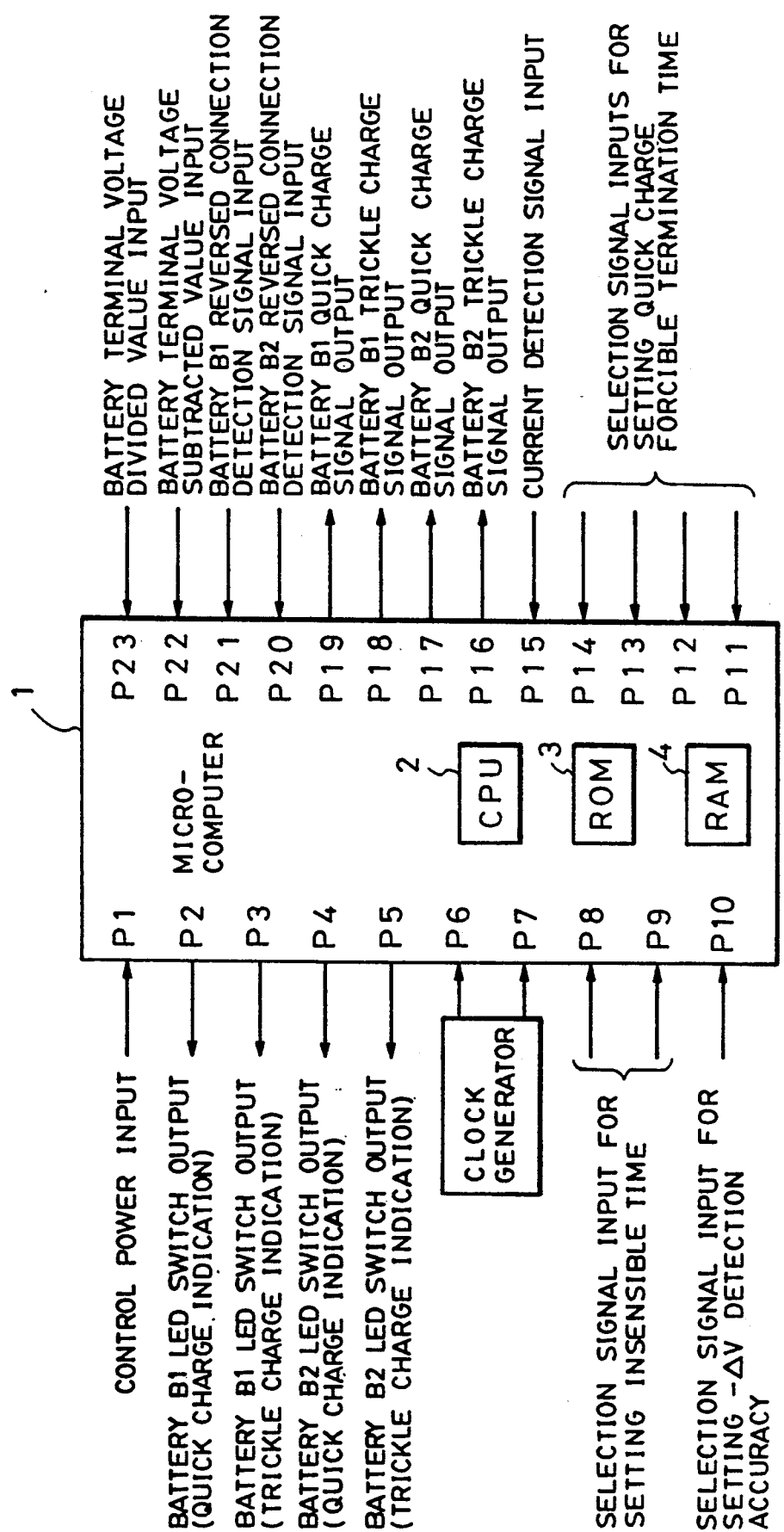
FIG. 1 is a schematic diagram of a charging controller in accordance with an embodiment of the present invention.

FIG. 1 schematically shows a charging controller in accordance with an embodiment of the present invention, which is adapted for a system in which two batteries B1 and B2 can be charged by one DC power source.

The charging controller includes a microcomputer 1 which includes a CPU 2, a ROM 3, and a RAM 4. The ROM 3 is a fixed memory for storing a processing program. The RAM 4 is a temporary memory unit serving as registers for temporarily storing parameters for processing operations, data produced during processing operations and so on. The CPU 2 is a central processing unit which performs calculations of data and parameters in accordance with the processing program.

The microcomputer 1 is provided with a plurality of input/output terminals P1, P2, P3, . . . through which various signals and power supply voltages are input/output. The microcomputer 1 has terminals P1 to P10 shown on the left-hand side of FIG. 1. The terminal P1 is an input terminal through which a control power supply input is received, the terminal P2 is an output terminal through which a current for lighting a red LED is supplied to indicate quick charging of the battery B1, and the terminal P3 is an output terminal through which a current for lighting a green LED is supplied to indicate that the battery B1 is being charged in a trickle charge manner. The terminals P4 and P5 are output terminals for supplying red and green LED driving currents for indicating quick charging and trickle charging of the battery B2. The terminals P6 and P7 are input terminals for receiving clock signals from a clock generator. The terminals P8 and P9 are input terminals each for receiving a selection signal for setting an insensible time at an initial stage of the charging operation. The terminal P10 is an input terminal for receiving a selection signal for setting the accuracy of detection of $-\Delta V$ for detection of a full charge during the charging operation. The microcomputer 1 has terminals P11 to P23 shown on the right-hand side of FIG. 1. The terminals P11, P12, P13, and P14 are terminals each for inputting a selection signal for setting a quick charge forcible termination time to forcibly terminate quick charging. Selection signals are input through the input terminals P8 to P14 to finely adjust the setting of the charging operation in accordance with the ratings of the batteries and other factors.

The terminal 15 is a current detection signal input terminal for inputting the value of a charging current detected from the outside. The terminals P16 and P17 are output terminals for outputting a trickle charge signal and a quick charge signal for driving switches for charging the battery B2. The terminals P18 and P19 are output terminals for outputting a trickle charge signal and quick charge signal for driving switches for charging the battery B1. The terminals P20 and P21 are input terminals for receiving reversed connection detection signals from a reversed connection detection circuit which detects reversed connections of the batteries B2 and B1. The terminal P22 is a terminal for inputting a value obtained by subtracting a certain value from the battery terminal voltage during quick charging. The terminal P23 is a terminal for inputting a value obtained by dividing the battery terminal voltage during quick charging. That is, a value proportional to the battery terminal voltage during quick charging is obtained through the terminal P23, while a value which correctly reproduces the change in the battery terminal voltage during charging is obtained through the terminal P22.

As registers of the RAM 4 for temporarily storing data and parameters, the following registers or timers are included:

Insensible time ($t_1$) timer FIRST which is a timer for setting a period of insensible time $t_1$ at an initial stage of charging during which occurrence of a peak of the battery terminal voltage is ignored, and which timer has a configuration of, e.g., $4 \times 3 = 12$ bits;

Forcible termination time ($t_2$) timer CARGET which is a timer for setting a period of time at the end of which quick charging is forcibly terminated in a case where no peak of the voltage between the battery terminals is exhibited, that is, $-\Delta V$ is not detected even through quick charging is performed, and which timer has a configuration of, e.g., $4 \times 4 = 16$ bits;

Full charge ($-\Delta V$) detection voltage range register DELTAW which is a register for setting a voltage range for determining a full charge in such a manner that the voltage between the terminals is reduced from the maximum of the voltage between the terminals presently determined to an extent corresponding to the set voltage range, and which has a configuration of, e.g., 4 bits;

Real time counter REAL which is a register for counting the period of charging time during which quick charging or trickle charging is performed, and for storing this period of time, and which has a configuration of, e.g., $5 \times 4 = 20$ bits;

Charging mode flag register FCHARGE which has a flag indicating the mode of charging each battery, i.e., quick charging, trickle charging and the completion of charging, and which has a configuration of, e.g., 4 bits;

Battery terminal voltage register VDATA which is a register for storing a value obtained by A/D conversion of the voltage between the terminals of the charged battery, and which has a configuration of, e.g., $4 \times 2 = 8$ bits;

Maximum voltage register VMAX which is a register for storing the maximum of the voltage between the battery terminals presently determined, and which has a configuration of, e.g., $4 \times 2 = 8$ bits;

Attached state flag register FSET which is a register for storing a flag indicating whether or not each battery is attached, and which has a configuration of, e.g., 4 bits;

Calculation stock register STOCK which is an auxiliary area for storing a numerical value for calculation, e.g., the sum of the numbers stored in the two registers VDATA and DELTAW, and which has a configuration of, e.g., $4 \times 2 = 8$ bits; and Charging switch data register OUTIMAGE which is a register for storing data on the state of each charging switch, i.e., charging mode output data, and which has a configuration of, e.g., 4 bits.

Other various registers, which are not described here, may be provided in the RAM 4 if necessary.

The microcomputer constructed as shown in FIG. 1 is combined with peripheral units to perform the desired charging operations.

Figure 2:
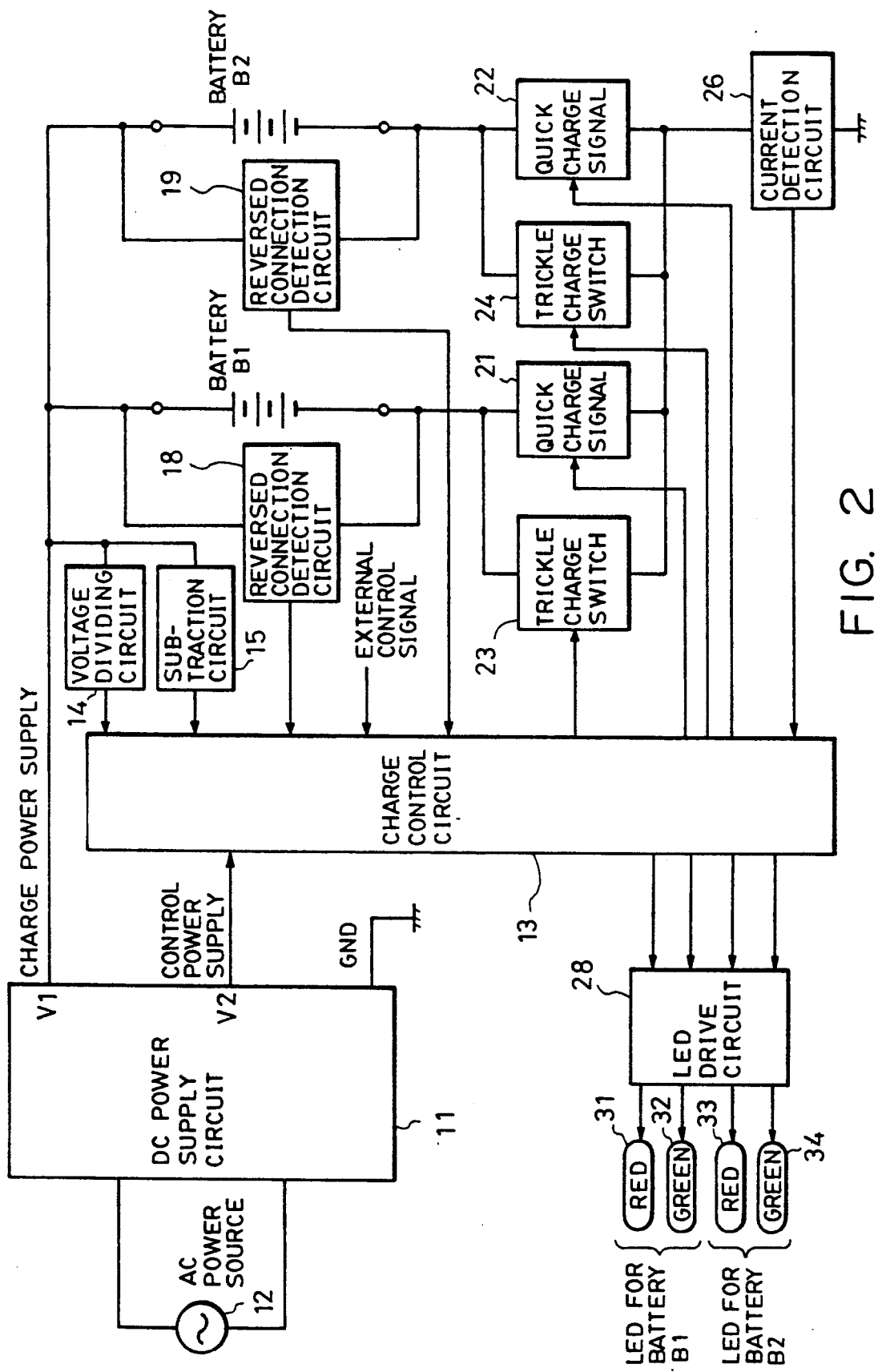
FIG. 2 is a block diagram of the charging circuit realized by using the charging controller shown in FIG. 1.

FIG. 2 is a block diagram of a charging circuit realized by employing the microcomputer of FIG. 1.

A DC power supply circuit 11 receives electric power from an AC power source 12 to supply several direct currents. By a first DC voltage V1, power for charging the batteries B1 and B2 is supplied. This power supply has a highest voltage and a largest current. The terminal voltage of the batteries B1 and B2 is divided by a voltage dividing circuit 14 to be supplied to a charge control circuit 13. The charge control circuit 13 includes the microcomputer 1 of FIG. 1 as a main component. Also, this terminal voltage is level-converted by a subtraction circuit 15 to be supplied to the charge control circuit 13. That is, the voltage supplied by the voltage dividing circuit 14 represents the battery terminal voltage on a reduced scale, while the voltage supplied by the subtraction circuit 15 correctly represents the change in the battery terminal voltage without reducing it. The charge control circuit 13 operates by receiving the control power supply voltage V2 from the DC power supply circuit 11. The voltage V2 is lower than the charging voltage V1 and is stable. Since V2 is lower than V1, it is difficult to directly measure the battery terminal voltage by the charge control circuit 13 unless the terminal voltage is divided by the voltage dividing circuit 14. Reversed connection detection circuits 18 and 19 are respectively connected parallel with the batteries B1 and B2. The circuits 18 and 19 detect reversed connections of the batteries and supply binary detection signals to the charge control circuit 13. That is, if each battery is reversely connected in error, the corresponding reversed connection detection circuit detects this reversed connection, and the charge control circuit 13 stops charging. Quick charge switches 21 and 22 are respectively connected to the batteries B1 and B2 in series, and trickle charge switches 23 and 24 are connected in parallel with the quick charge switches 21 and 22. A charging current flowing through the switches 21 to 24 is grounded through a current detection circuit 26. A control signal is sent from the charge control circuit 13 to each of the charging switches 21 to 24 to control the switching operation. The current detection circuit 26 detects the current flowing through the switches and supplies the detected current value to the charge control circuit 13. When a signal is output from the charge control circuit 13 to one of the charging switches 21 to 24 to effect charging, a corresponding signal is also supplied from the control signal circuit 13 to the LED drive circuit 28 to drive one of LEDs 31 to 34 for color indication, thereby indicating the charging mode. For example, in a case where the battery B1 is being trickle charged while the battery B2 is quickly charged, the green LED 32 for the battery B1 and the red LED 33 for the battery B2 are lighted.

The charge control circuit 13 controls the operation of charging the battery B1 and the battery B2 in accordance with a predetermined charging program stored in the ROM 3 shown in FIG. 1.

Figure 3:
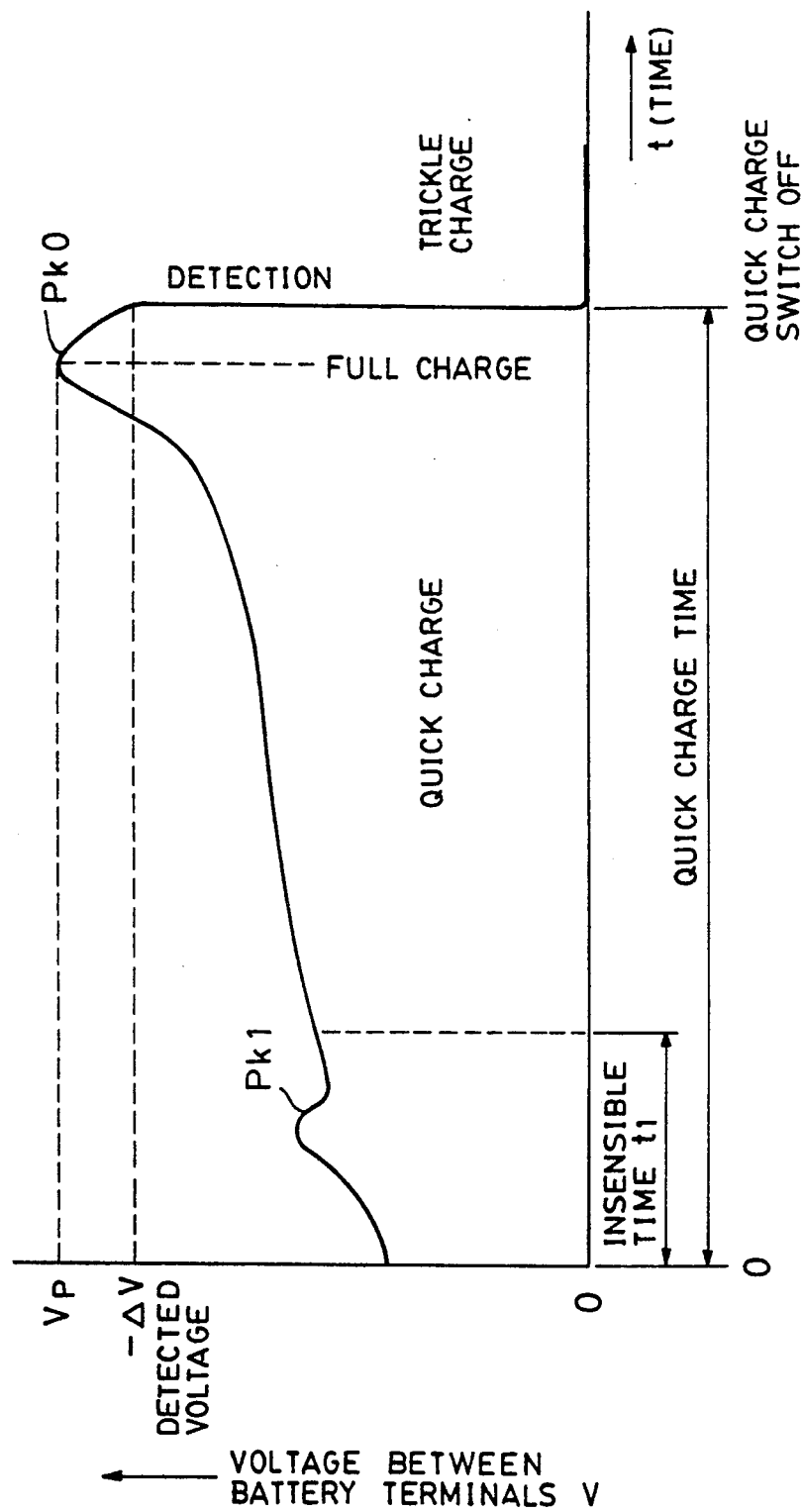
FIG. 3 is a graph showing an example of a normal charging characteristic.
Figure 4:
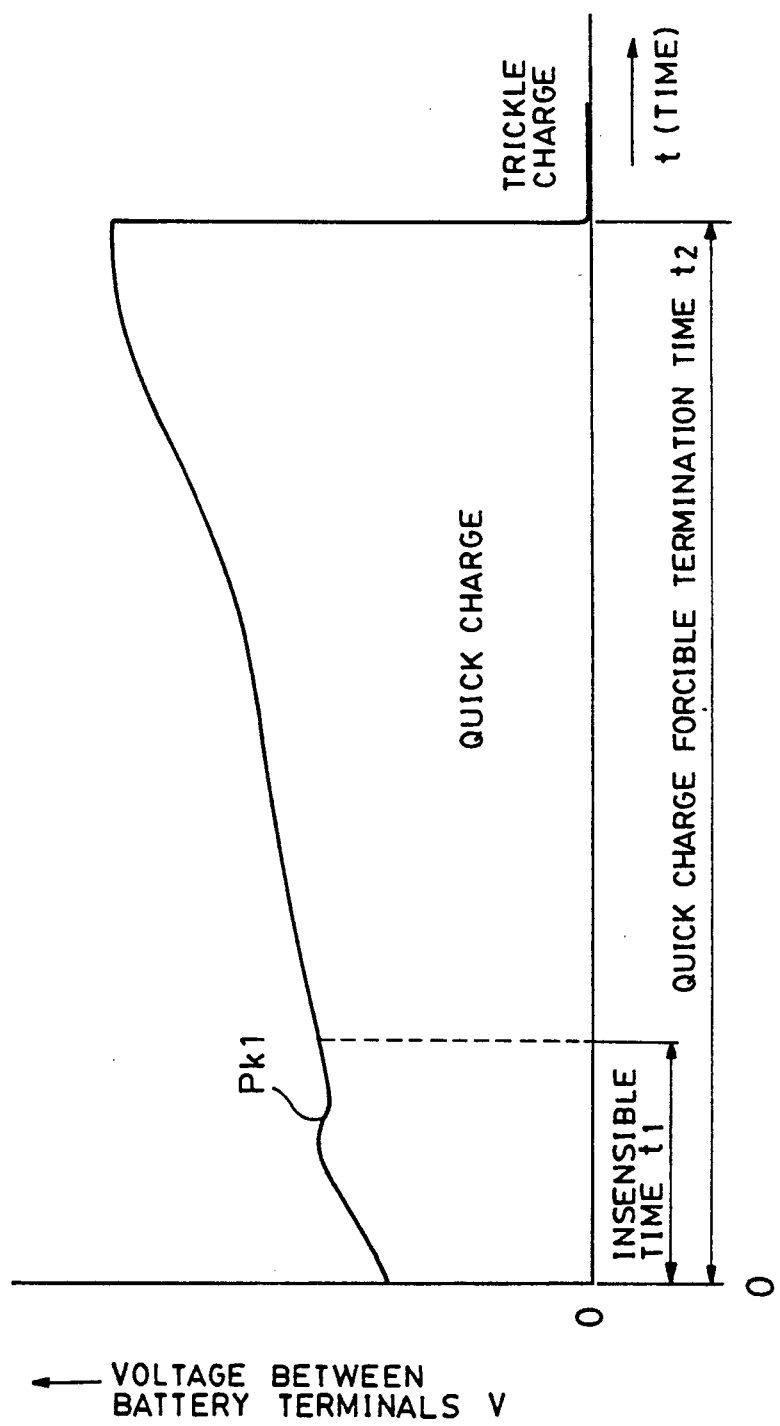
FIG. 4 is a graph showing an example of a deteriorated charging characteristic.

FIGS. 3 and 4 show examples of characteristics of charging thereby controlled.

FIG. 3 shows an example of a characteristic of normal charging. In FIG. 3, the abscissa represents the charging time t and the ordinate represents the voltage V between the terminals of the battery.

In the case of a battery newly used or a battery not used during a long time, a peak of the voltage value is usually exhibited at an initial stage of the operation of quickly charging the battery. The possibility of mistaking such a peak for a peak representing a full charge is precluded by setting an initial period of time as insensible time $t_1$ during which full charge detection is not effected. That is, even if a peak Pk1 appears as shown in FIG. 3 or 4, the charging circuit ignores this peak. The time at which such an initial peak appears is changed depending upon the capacity of the DC power source, the battery capacity and other factors. A suitable length of insensible time $t_1$ is therefore set according to the ratings of the charging circuit and the battery. The insensible time $t_1$ in an initial charging period is set by a signal input into the microcomputer 1 through the terminal 8 or 9. As quick charging is continued, the voltage V between the terminals of the battery is gradually increased to reach the maximum voltage Vp and is then reduced. The reduction in the voltage between the terminals after the maximum value has been reached is referred to as $-\Delta V$. That is, if $-\Delta V$ (peak $Pk_0$) is detected by monitoring the voltage between the terminals, it is possible to recognize that the battery is fully charged.

The range of the value to be set as $-\Delta V$ and suitable for detecting of the fully charged state varies depending upon the number of DC cells (rated voltage) of the battery and the accuracy of peripheral apparatuses. For this reason, the controller is designed so that two voltages of 100 and 200 mV, for example, can be selected as voltages set for detection of $-\Delta V$. When a terminal voltage higher than one of these set voltages is exhibited, a fully charged state is recognized.

The accuracy of this detection is determined by a signal input into the microcomputer 1 through the terminal P10.

When a fully charged state is detected, quick charging is terminated and the charging operation is changed over to trickle charging. At this time, monitoring the voltage between the battery terminals is also terminated. Thereafter, trickle charging is continued. With respect to trickle charging as well, the operation of terminating trickle charging is performed after the lapse of a predetermined long length of time (e.g., 12 hours).

FIG. 4 shows an example of a charging characteristic of a deteriorated battery. The abscissa represents the charging time t and the ordinate represents the voltage V between the terminals of the battery, as in FIG. 3.

In the case of a battery deteriorated during long-term use, it is possible that no full-charge peak is exhibited. For example, as shown in FIG. 4, a peak $Pk_1$ appears at an initial stage of charging and within the insensible time, and the voltage between the battery terminals is not reduced while quick charging is thereafter continued. In such a case, since no full-charge peak is detected, quick charging is endlessly continued. Since such a battery has deteriorated performance, no full-charge peak appears even though the charging time is increased. The charging efficiency is therefore reduced considerably unless the charging is stopped by suitable timing. It is therefore preferable to stop charging in a case where no full-charge peak appears even during quick charging for a certain length of time. For example, with respect to a normal battery, a time about three times longer than the time necessary for fully charging the battery is set as a length of time $t_2$ at the end of which quick charging is forcibly terminated. The time $t_2$ varies depending upon the capacity of the DC power source, the current capacity of the battery and other factors. The quick charge forcible termination time $t_2$ is therefore set to a suitable length according to the ratings of the charging circuit and the battery and other factors.

The length of time $t_2$ at the end of which quick charging is forcibly terminated is determined by quick charge forcible termination times input into the microcomputer 1 through the terminals P11 to P14. That is, when the quick charge forcible termination time $t_2$ is reached by the quick charging time, quick charging is terminated and the charging operation is changed over to trickle charging.

The charging operation of the charging circuit shown in FIG. 2 will be described below. Before the detailed description of the flow chart, essential sections of a main routine and a timer interruption routine will be described first with reference to FIGS. 5 and 6.

The flow starts (step S1), and an initialization step including initialization of the registers is executed (step S2). Initial insensible time $t_1$ is then input (step S3). This initial insensible time $t_1$ is stored in the register 1ST (T) provided in the RAM (step S4). The detection accuracy $\Delta V$ for detection of the fully-charged state is successively input (step S5), and is stored in the register DEL (W) in the RAM (step S6). Quick charge forcible termination time $t_2$ determining the timing of forcibly terminating quick charging is then input (step S7), and is stored in the register 2ND (T) in the RAM (step S8). By this sequence of operations, parameters of the charging operation thereafter performed are set.

Next, determination is made as to whether or not the battery B1 is attached (step S9). If the battery B1 is attached, the process proceeds as indicated by the arrow YES to step S10 of quick charging the battery B1. After quickly charging the battery B1, determination is made in the next step S11 as to whether or not the other battery B2 is attached. If the battery B2 is also attached, the process proceeds to step S12 as indicated by the arrow YES to tricklingly charge the battery B1 and to quickly charge the battery B2. After quick charging of the battery B2 has been finished, both the batteries B1 and B2 are tricklingly charged (step S13). After trickle charging has been sufficiently performed, the charging operation is stopped (step S14). If it is determined (in step S9) that the battery B1 is not attached, that is, the process proceeds to step S17 as indicated by the arrow NO to determine whether or not the battery B2 is attached. If the battery B2 is attached, the process proceeds to the next step S18 as indicated by the arrow YES to quickly charge the battery B2. When the battery B2 is fully charged, quick charging is terminated and the battery B2 is then charged tricklingly (step S19). When trickle charging is completed, the charging operation is stopped (step S20). If the battery B2 also is not attached, the process returns from step S17 to step S9 as indicated by the arrow NO. If it is determined in step S11 that the battery B2 is not attached, the process proceeds to step S15 to tricklingly charge the battery B1 alone, and the charging operation is thereafter terminated (step S16).

Thus, the attachment of each battery is confirmed and the batteries are successively charged by quick charging and trickle charging.

Figure 5:
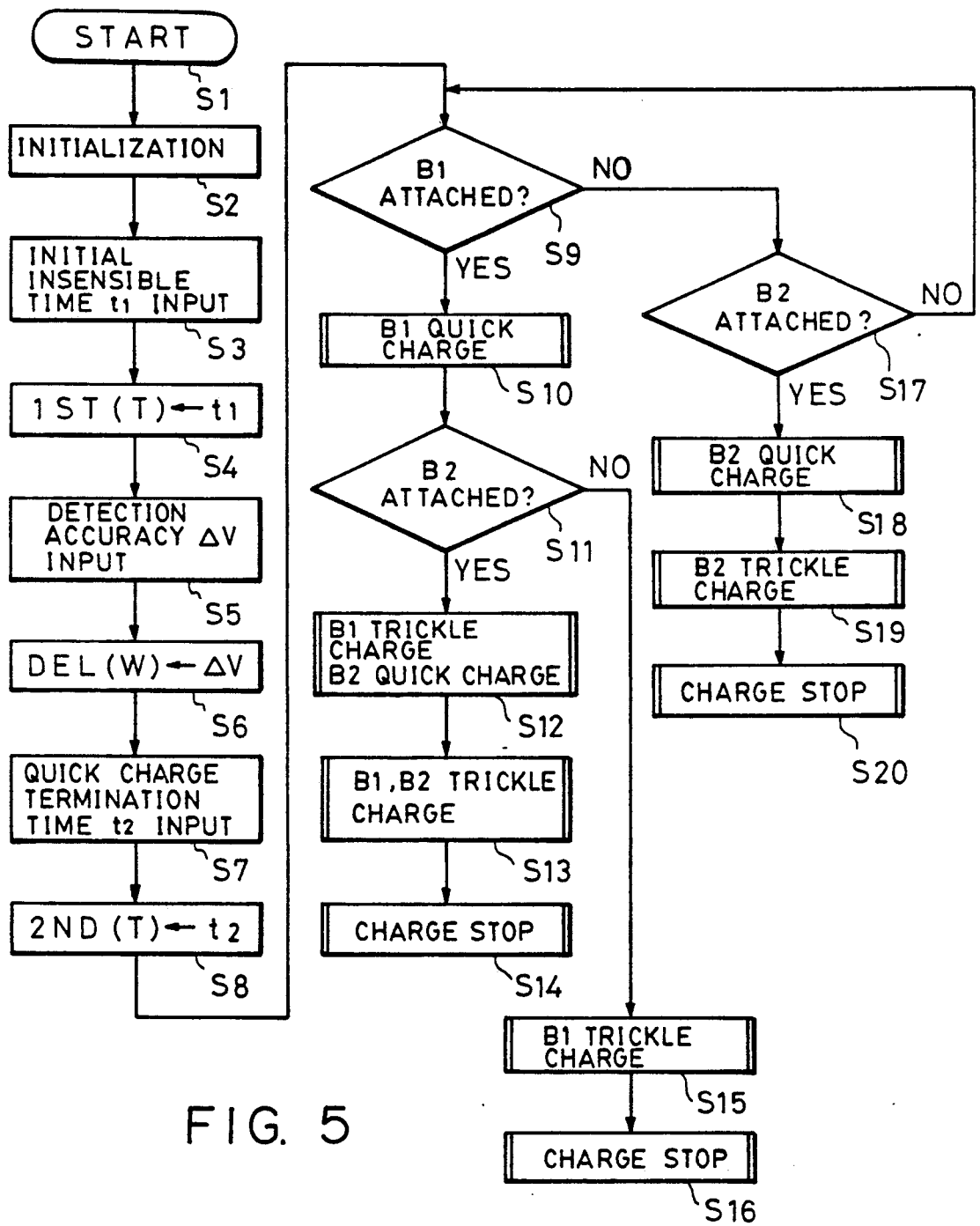
FIG. 5 is a flow chart of essential sections of a main routine for charge control.

The timing of terminating quick charging or trickle charging in the flow of the main routine shown in FIG. 5 is determined according to the result of detection effected in the timer interruption routine.

Figure 6:
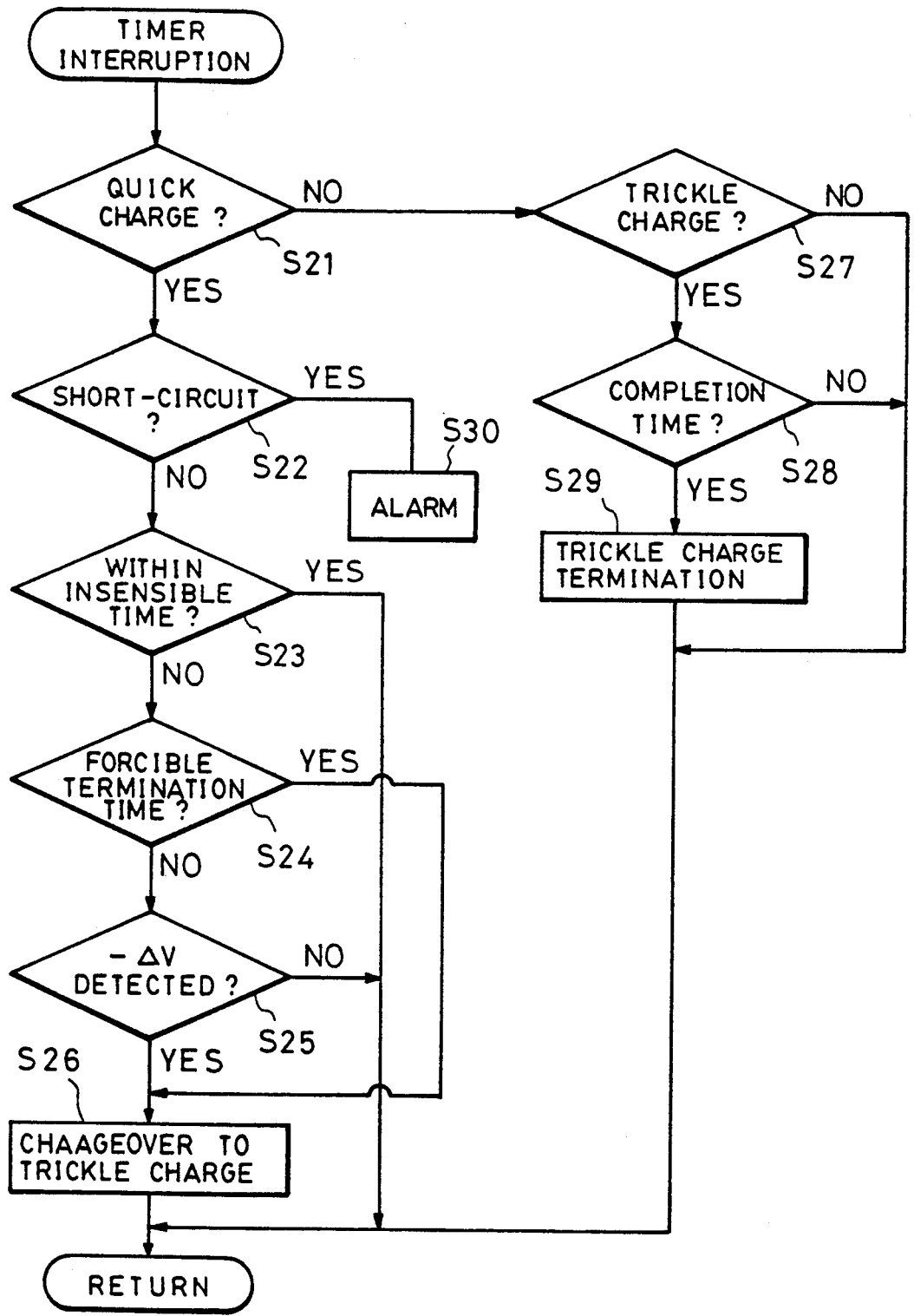
FIG. 6 is a flow chart of a timer interruption routine for charge control.
Figure 7:
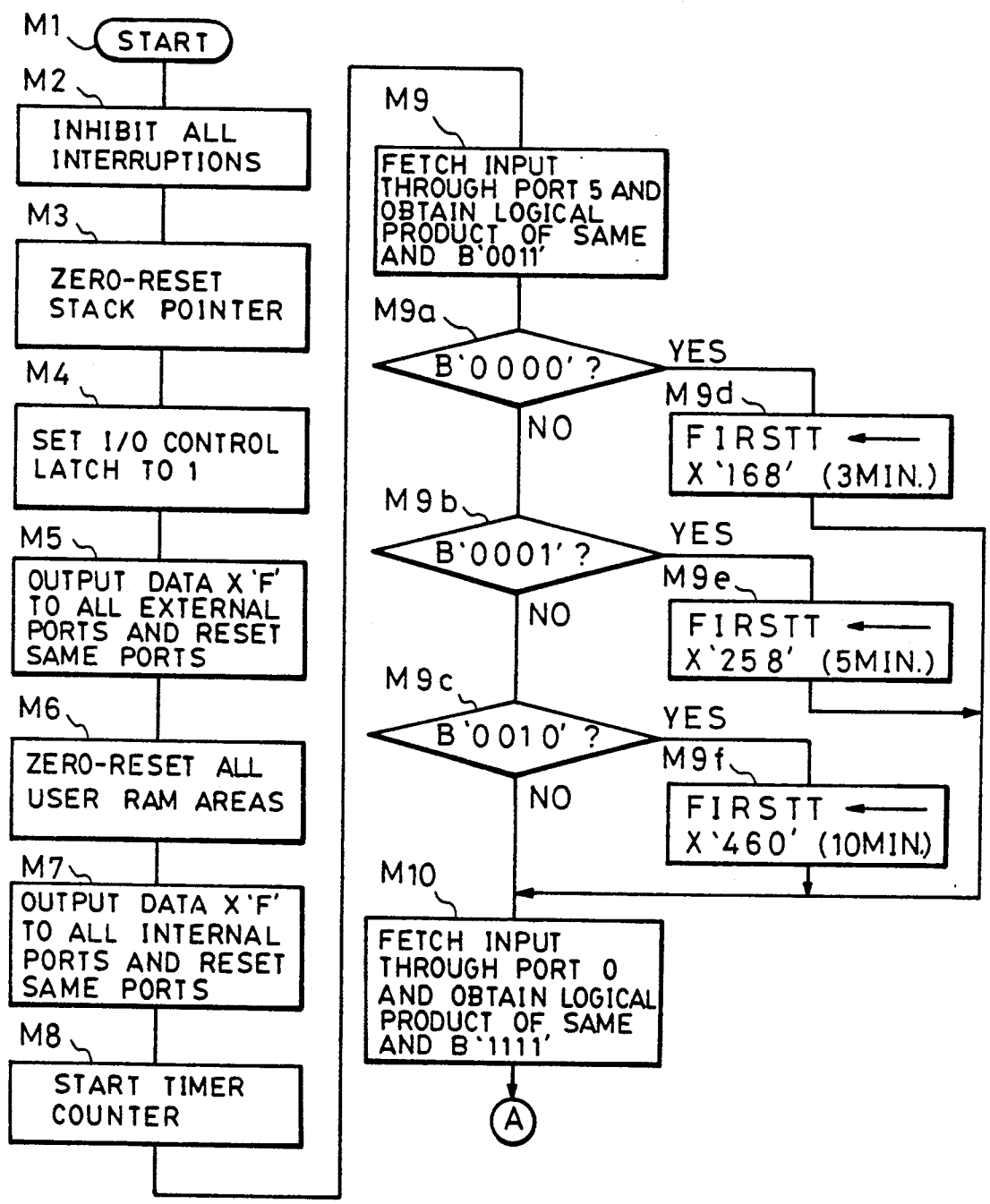
FIGS. 7(1) to 7(10) are flow charts of details of the main routine.
Figure 7:
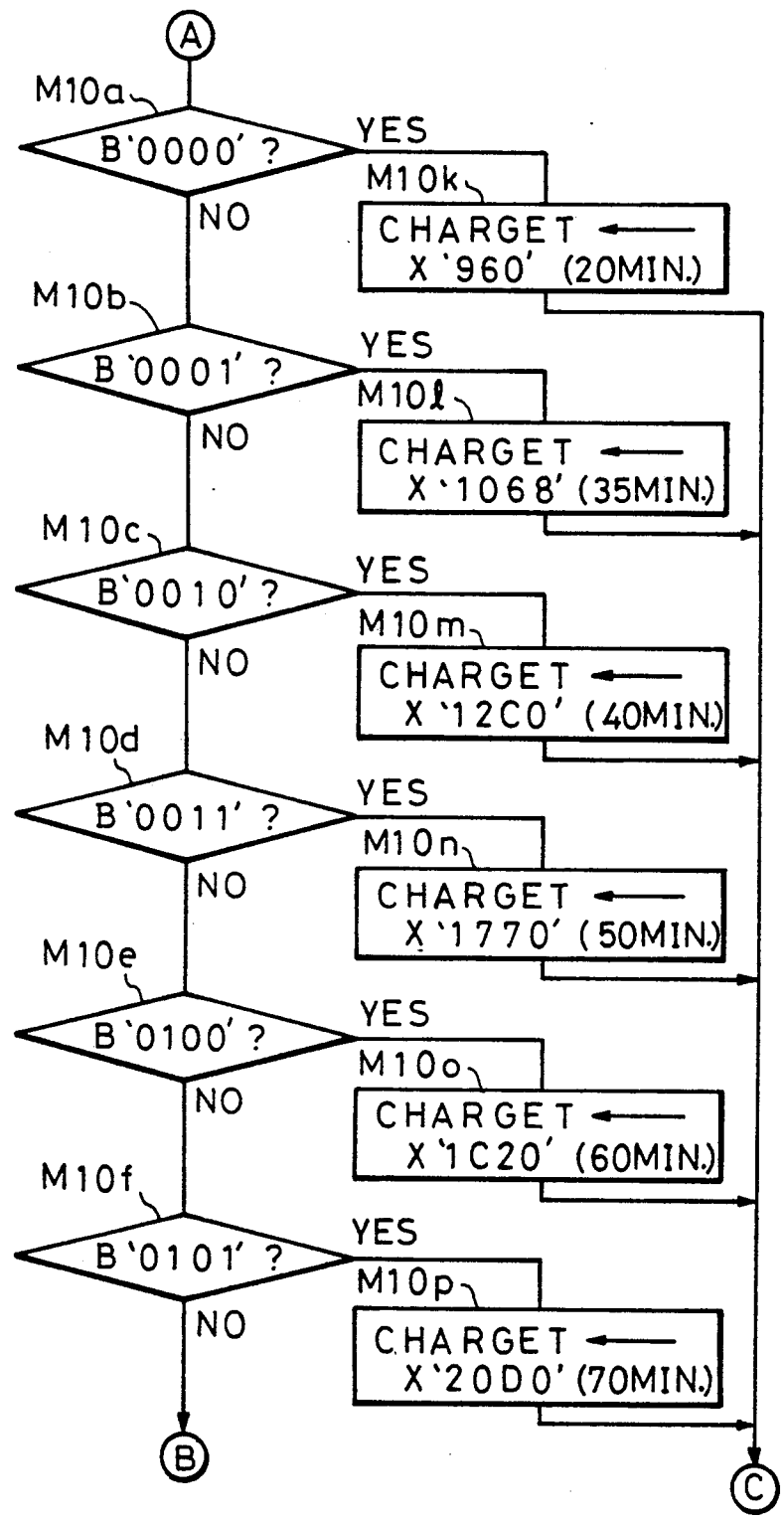
Figure 7:
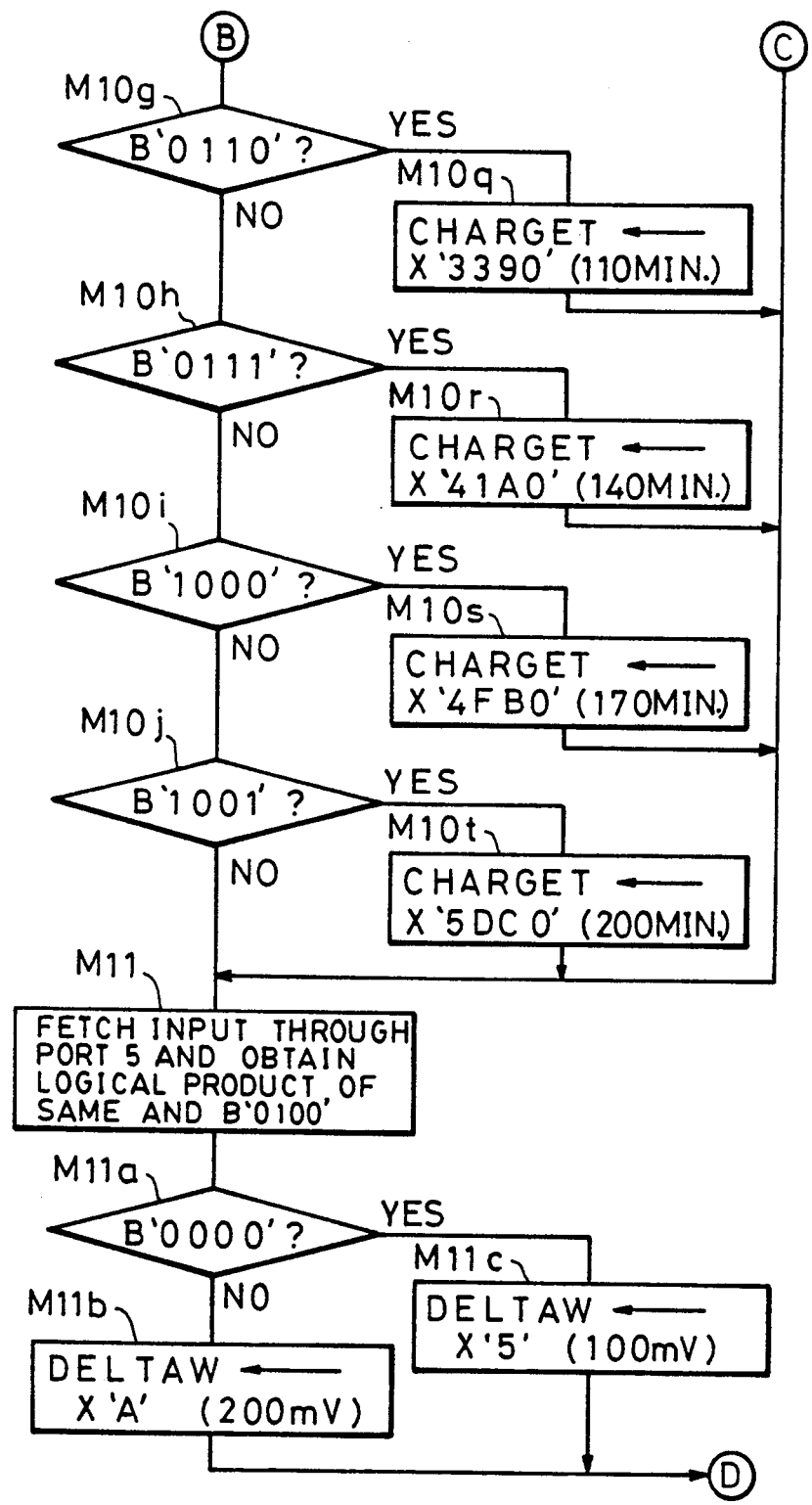
Figure 7:
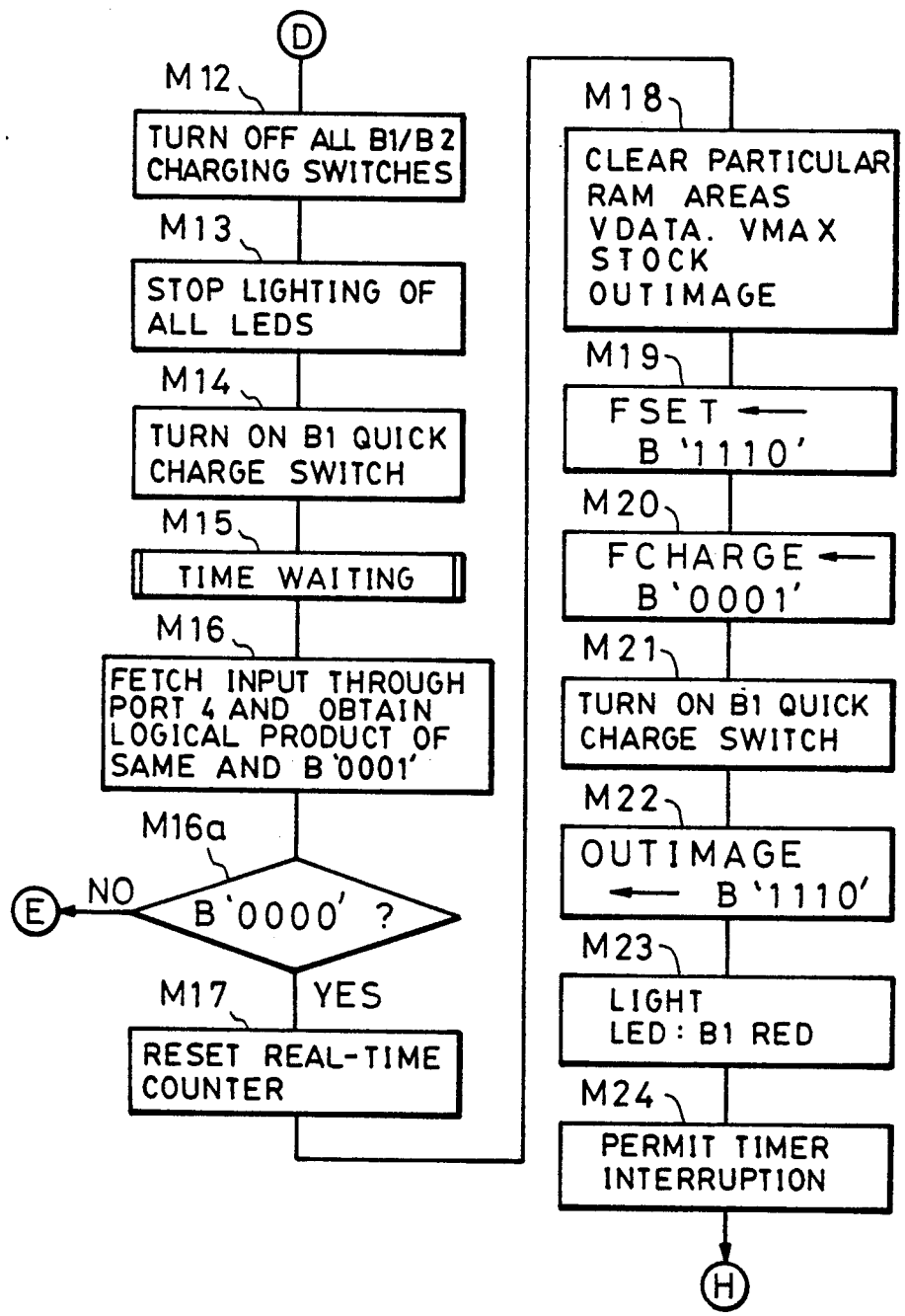
Figure 7:
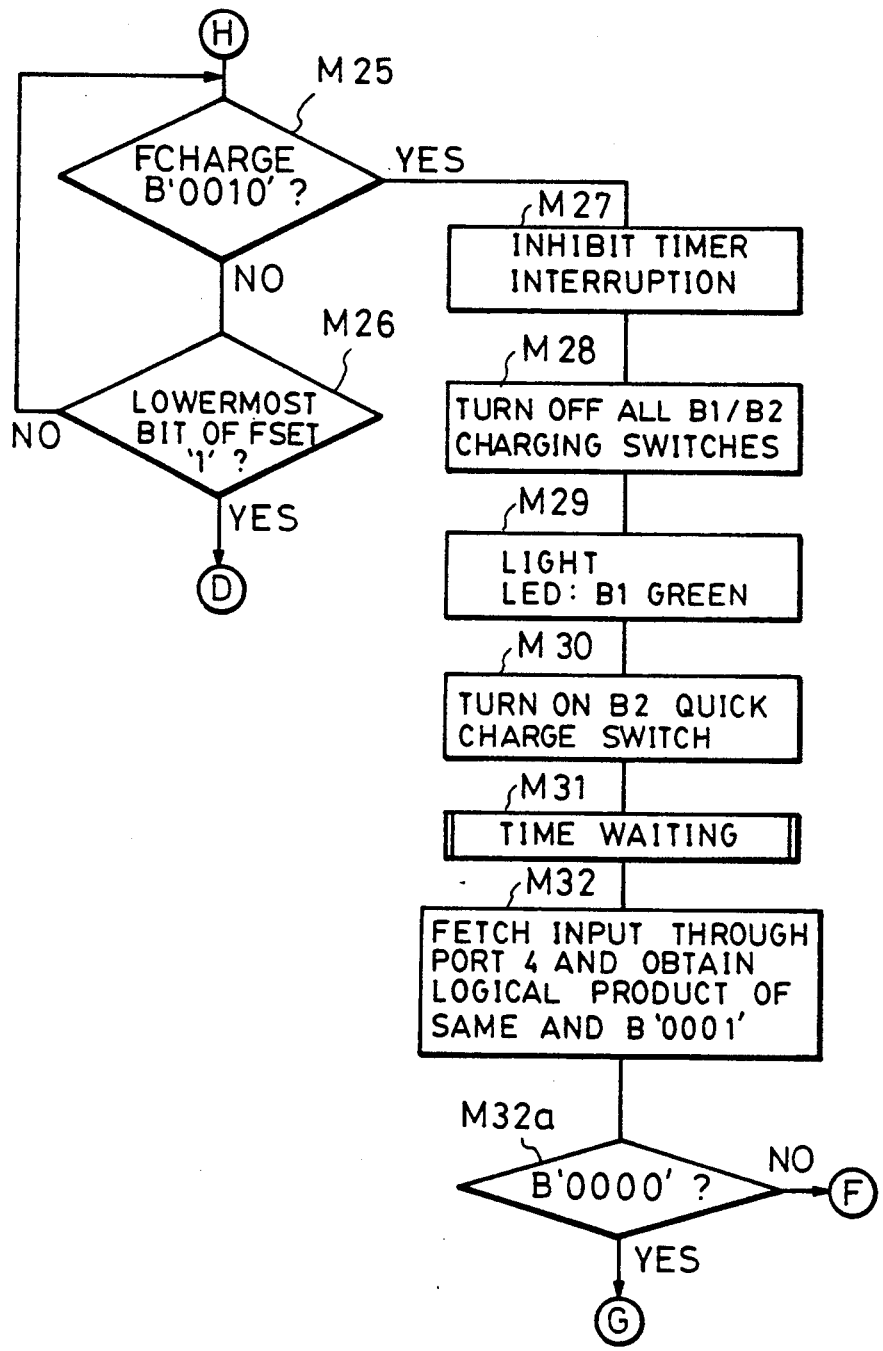
Figure 7:
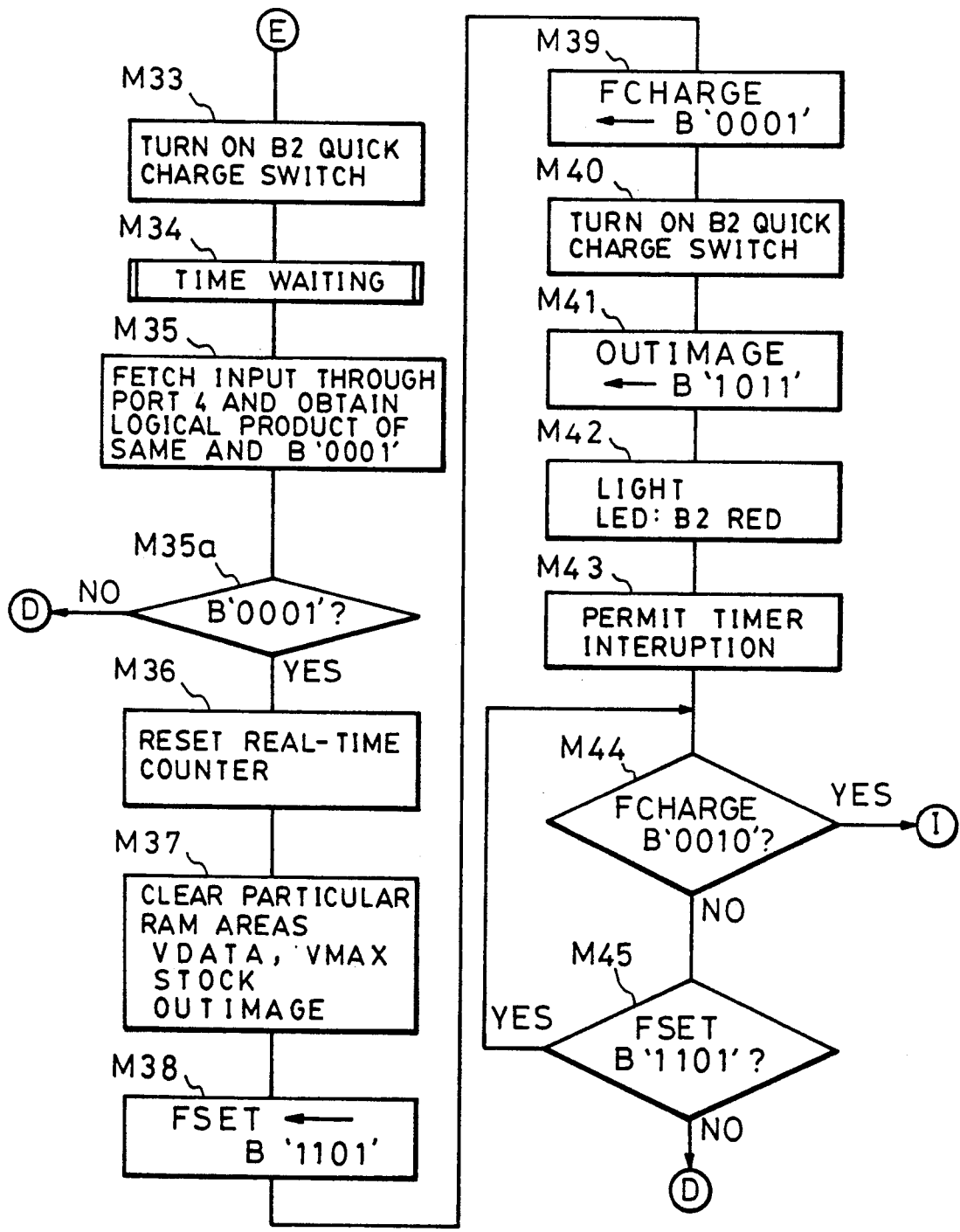
Figure 7:
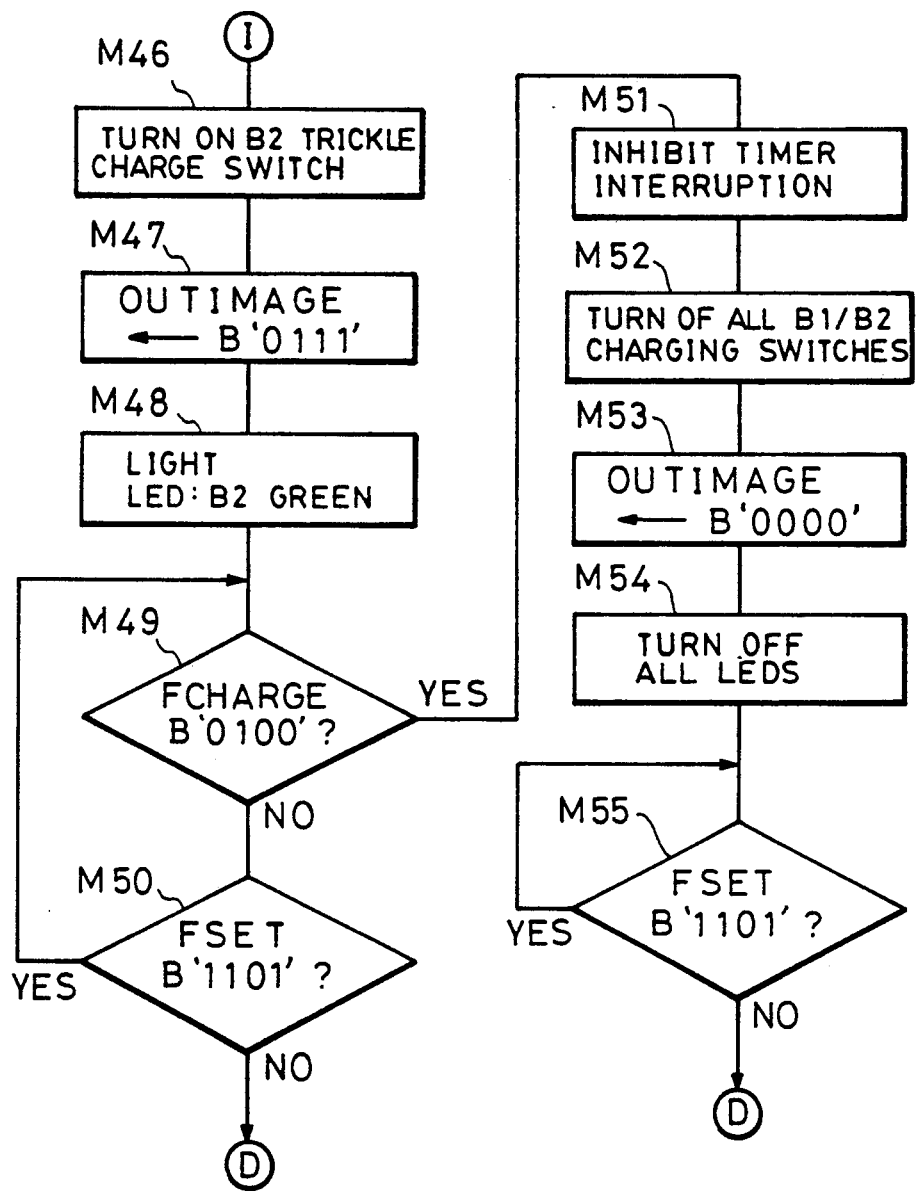
Figure 7:
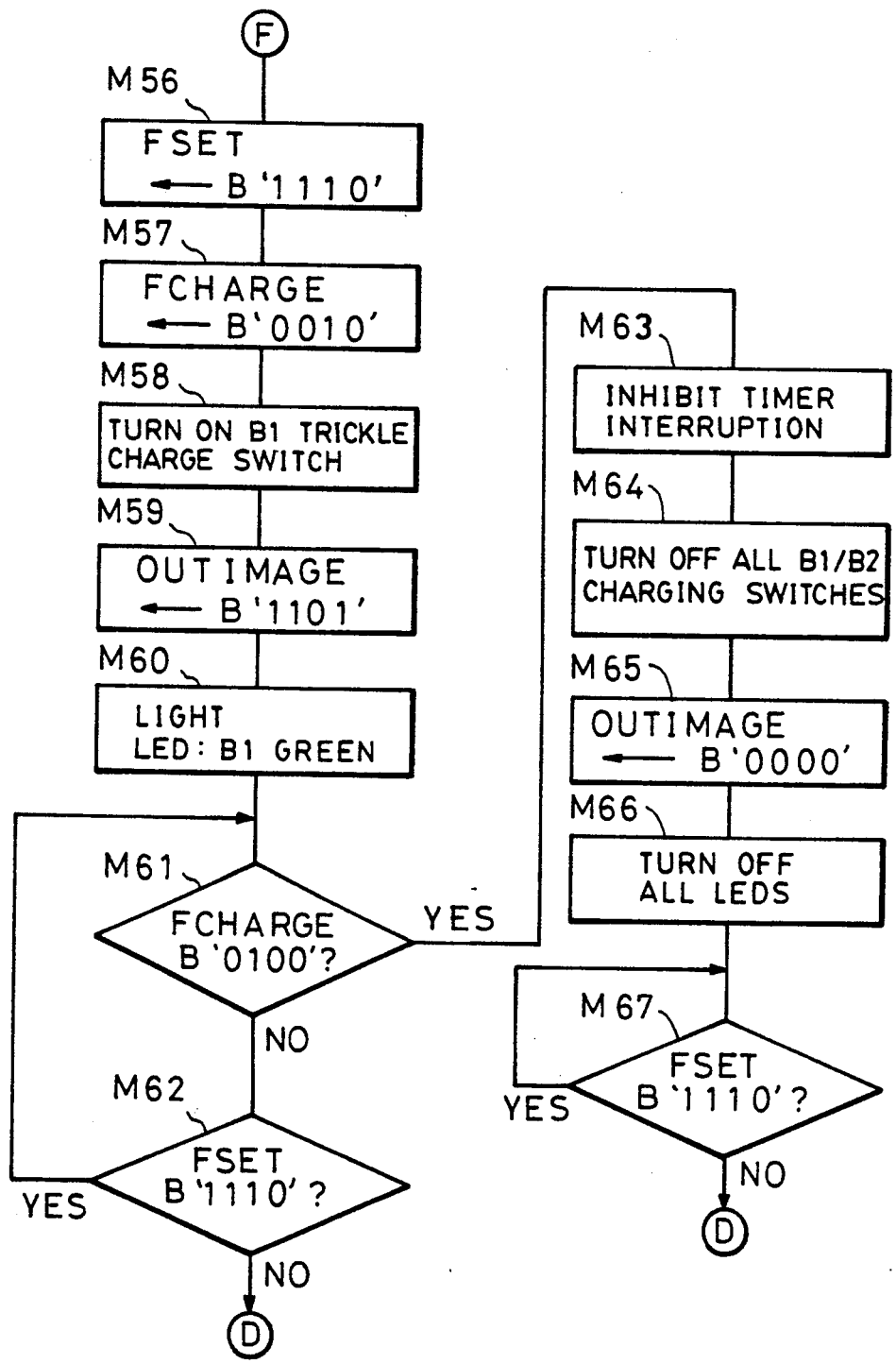
Figure 7:
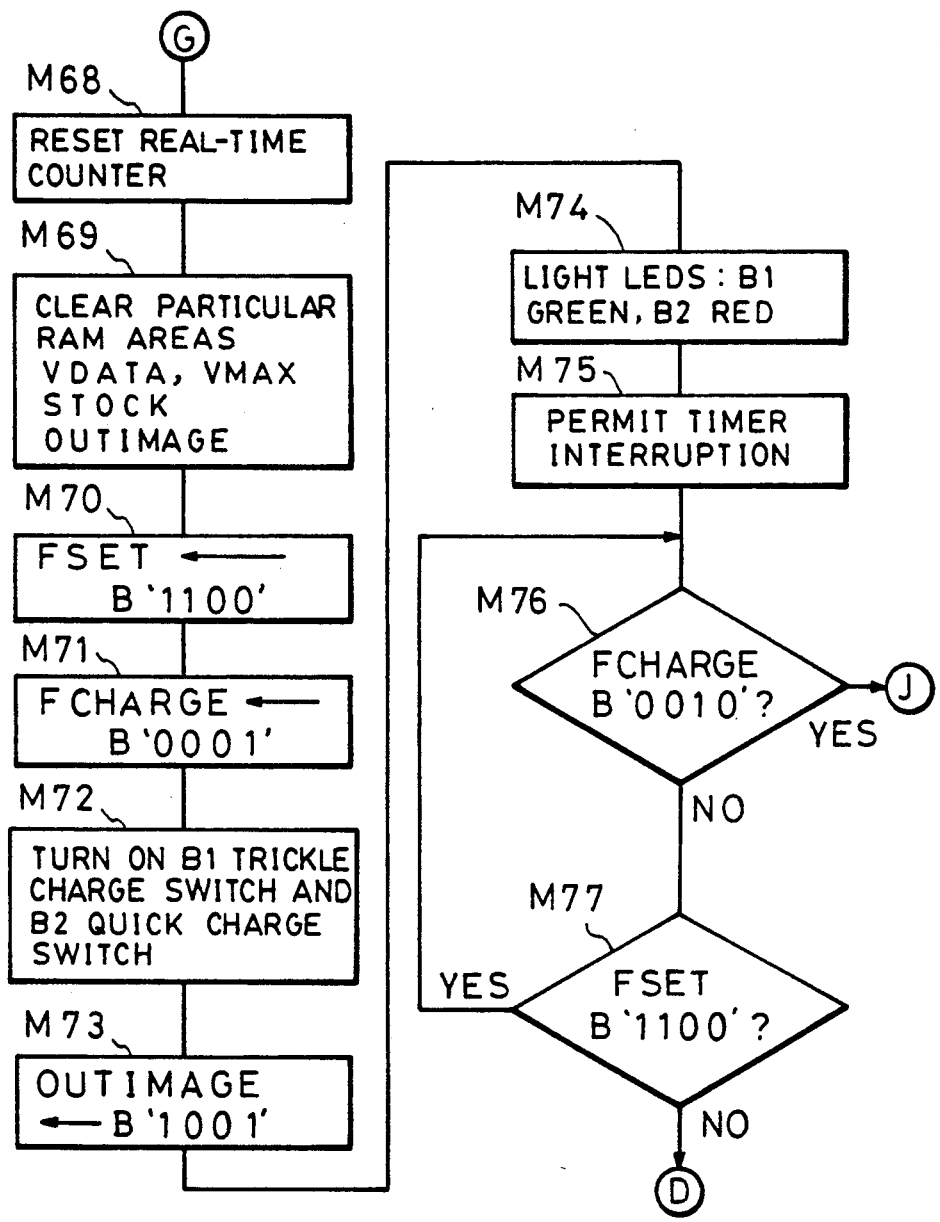
Figure 7:
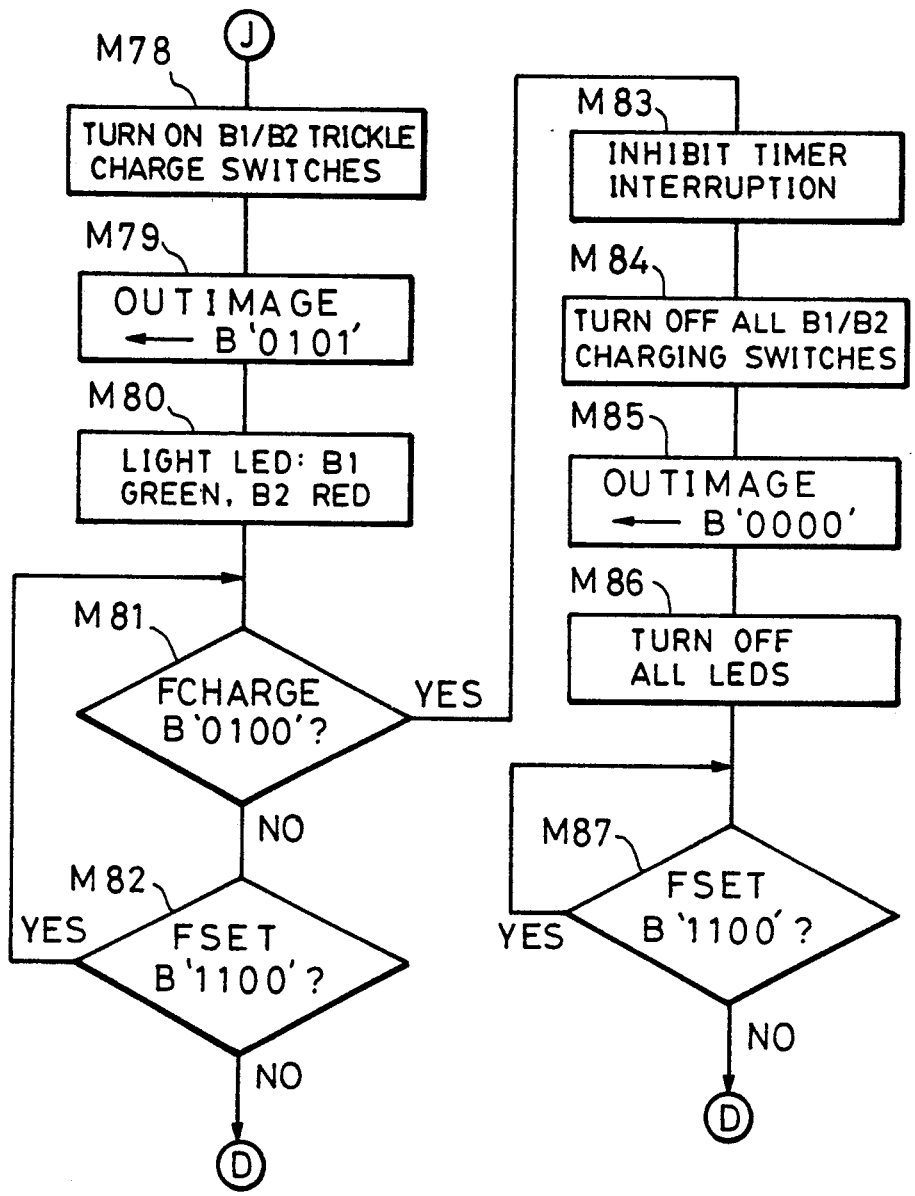

FIG. 6 shows a flow chart of the timer interruption routine.

When the timer interruption is started, determination is made as to whether or not quick charging is being performed (step S21). If quick charging is being performed, the process proceeds to the next step S22 as indicated by the arrow YES to determine whether or not each battery is short-circuited. If the battery is not short-circuited, the process proceeds to the next step S23 as indicated by the arrow NO. In step S23, determination is made as to whether or not the quick charging time is within the insensible time. If the quick charging time is within the insensible time, the process returns as indicated by the arrow YES without detecting $-\Delta V$. If the insensible time at the initial charging stage has already elapsed, the process proceeds to the next step S24 as indicated by the arrow NO to determine whether or not the quick charging forcible termination time has been reached. If the forcible termination time has been reached, the process jumps to step S26 as indicated by the arrow YES to change the charging operation from quick charging to trickle charging. If the termination time is still unreached, the process proceeds to a $-\Delta V$ detection step (step S25) as indicated by the arrow NO. If $-\Delta V$ is detected, the process proceeds as indicated by the arrow YES to change the charging operation from quick charging to trickle charging (step S26), and thereafter returns.

If it is determined in step S21 that quick charging is not being performed, determination is made as to whether or not trickle charging is being performed (step S27). If trickle charging is being performed, the process proceeds as indicated by the arrow YES and determination is made as to whether or not the trickle charging completion time is reached (step S28). The trickle charging completion time is ordinarily set to a sufficiently long time, e.g., 12 hours. If the completion time has already been reached, trickle charging is terminated (step S29) and the process returns. If it is determined in step S27 that trickle charging is not being performed, that is, either quick or trickle charging is not being performed, the process returns immediately. If it is determined in step S28 that the trickle charging completion time is unreached, the process returns to continue trickle charging.

If it is determined in step S22 that the battery is short-circuited, the charging operation is not started and an alarm is issued (step S30) to warn the operator.

The main routine, which has schematically been described with reference to FIG. 5, will be described below in detail.

When the process is started (step M1), all interruptions are prohibited (step M2), whereby data and the like is prevented from being destroyed by interruptions during processing.

next, the position on the program is set to a leading position by zero-resetting the stack pointer (step M3). Then the I/O control latch is set to 1 to enable I/O ports to be used (step M4). Data X "F" is output to all external ports to reset the external ports (step M5). F is hexadecimal 16 and is binary 1111. In the active flow logic, this number corresponds to the stationary state. Thereafter, all user RAM areas are zero-reset (step M6). Also, date X "F" is output to all internal ports to reset the internal ports (step M7). The timer counter is successively started to time counting (step M8).

Next, in step M9, insensible time $t_1$ at an initial stage of charging during which peak detection is prohibited is input through input port 5 and a logical product of the input and "0011" is obtained. That is, time $t_1$ is expressed by a signal having a lower two bits.

In this embodiment, three times are set as insensible time $t_1$ and each of them is expressed by two bits. The result of multiplication is expressed by one of "0000", "0001", and "0010" shown with respect to steps M9a, M9b and M9c.

Accordingly, the result of multiplication is YES in one of steps M9a, M9b and M9c. If the result is "0000", the process proceeds to step M9d and "168" (representing three minutes) is stored in the register FIRSTT. If the result is "0001", "258" (corresponding to five minutes) is stored in the register FIRSTT (step M9e). If the result is "0010", "460" (corresponding to ten minutes) is stored in the register FIRSTT (step M9f).

After insensible time $t_1$ has been set by these steps, the process proceeds to step M10 to input, through port 0, forcible termination time $t_2$ at the end of which quick charging is forcibly terminated in a case where a fully charged state is not detected while quick charging is continued. A logical product of this forcible termination time and "1111" is obtained. That is, the forcible termination time is expressed by a 4-bit signal.

In this embodiment, 10 lengths of time are set as quick charge forcible termination time $t_2$, and the value of the input forcible termination time corresponding to one of the set values is input into the register CHARGET in one of steps M10a to M10j. The set forcible termination times are 20, 35, 40, 50, 60, 70, 110, 140, and 170 minutes.

Next, in step S11, a $-\Delta V$ detection voltage range for full charge detection is input through port 5 and a logical product of this input and "0100" is obtained. That is, the detection voltage range is expressed by one bit in the uppermost one of the lower three places. The lower two bits of port 5 are already used for inputting insensible time parameter $t_1$, and the $-\Delta V$ detection voltage range is therefore expressed by using the third bit. In this embodiment, two values of $-\Delta V$ are set and one bit is used to represent each value.

Determination is made in step M11a as to whether the value of $-\Delta V$ input is lower one (100 mV). If it is 100 mV, the process proceeds to step M11c as indicated by the arrow YES to set "5" representing 100 mV in the register DELTAW. If the value is not 100 mV, the process proceeds to step M11b as indicated by the arrow NO to set "A" representing 200 mV in the register DELTAW.

Thus, insensible time $t_1$ set at an initial stage of charging, forcible termination time $t_2$ used in a case where no peak is detected while quick charging is continued, and the accuracy of detection of $-\Delta V$ for full charge detection are set to desired values by external inputs.

Thereafter, the attached state of the batteries is checked.

First, all the switches for charging the batteries B1 and B2 are turned off (step M12), and all the LEDs are turned off (step M13).

Next, the switch for quickly charging the battery B1 is turned on (step M14) and this state is maintained for a certain period of time (step M15).

Determination is made by detecting the current with the current detection circuit 26 shown in FIG. 2 as to whether or not the battery B1 is connected. That is, it is determined that the battery B1 is connected, if the current detected is greater than a certain value, or that the battery B1 is not connected, if the current is lower than this value. In step M16, for this determination, a logical product of a one-bit current value input through port 4 and "0001" is obtained and the battery connection is determined based on whether or not the logical product is "0000". When it is "0000", a current greater than the predetermined level is detected and it is determined that the battery B1 is connected. The process then proceeds to step M17 as indicated by the arrow YES to reset the real-time counter. That is, the timer is made to start counting simultaneously with the start of charging, and the charging time is thereby measured.

Next, as preparation of charging, initialization is effected for subsequent operations by clearing particular RAM areas (step M18). The areas to be cleared include VDATA, VMAX, STOCK, and OUTIMAGE. Then "1110" representing the attached state of the battery B1 is set as flag FSET for indicating the battery attachment state to store the data denoting that the battery B1 is attached (step M19). Successively, "0001" representing quick charging is stored as flag FCHARGE for indicating the mode of charging to register that the battery B1 is being quickly charged (step M20). After this preparation, the battery B1 quick charge switch is turned on in step M21 to quickly charge the battery B1. In step M22, "1110" denoting that the quick charging of the battery B1 is started is stored in the register OUTIMAGE for indicating the output image. Also, the red LED for indicating quick charging of the battery B1 is turned on (step M23).

When the above-described processing sequence is completed, timer interruption is permitted (step M24).

Thereafter, timer interruption is effected at time intervals of 0.5 sec. in this embodiment.

Thereafter, flag FCHARGE indicating the mode of charging is checked whether or not it has been changed into "0010" (step M25). That is, monitoring is performed to determine whether or not the charging operation has been changed over from quick charging to trickle charging. If it has not been changed over to trickle charging, the process proceeds to step M26 as indicated by the arrow NO to check whether or not the lowermost bit of flag FSET indicating the battery attachment state is 1. If the battery B1 is not detected, the lowermost bit is not 1 but 0 and the process returns to step M25 to form a cyclic loop. If YES in step M25, that is, trickle charging is started, the process proceeds to step M27 to inhibit timer interruption during subsequent processing, that is, to prevent destruction of data caused by timer interruption occurring during subsequent processing. In step M28, all the switches for charging the batteries B1 and B2 are turned off. Then, in step M29, the green LED for the battery B1 is turned on to indicate that changing of the battery B1 has been changed over to trickle charging. In step M30, the battery 2 quick charge switch is turned on to cause a current to flow through the battery B2. After the elapse of a certain length of time in step M31, the current is detected in step M32 to obtain a logical product of the existence/non-existence of the current and "0001", thereby checking the attachment of the battery B2. That is, if "0000" in step M32a, it is determined that the battery B2 is attached, and the process proceeds to quickly charge the battery B2. If the battery B2 is not attached, the process proceeds as indicated by the arrow NO to tricklingly charge the battery B1.

In step M33, a current is caused to flow through the battery B2 to determine whether or not the battery B2 is attached, in a case where it is determined in step M16a that the battery B1 is not attached. That is, the battery B2 quick charge switch is first turned on and steps M34 to M45 corresponding to steps M15 to M26 are successively executed. At this time, a current is caused to flow through the battery B2 to confirm the existence of the battery B2, quick charging of the battery B2 is started if the battery B2 is attached, and this fact is registered in the predetermined register.

If it is determined in step M44 that charging (of the battery B2) has been changed over to trickle charging, the process proceeds to step M46 as indicated by the arrow YES. The battery B2 trickle charge switch is turned on in step M46, this situation is indicated in the output image in step M47, and the green LED for indicating trickle charging of the battery B2 is turned on in step M48. Successively, determination is made in step M49 as to whether or not trickle charging is completed. When trickle charging is terminated, the process proceeds to step M51 as indicated by the arrow YES. If trickle charging is not terminated, the process proceeds to step M50 as indicated by the arrow NO to check the attachment state flag FSET, thereby determining whether or not the battery B2 is attached.

When the process proceeds to step M51 by determining in step M49 that trickle charging has been terminated, timer interruption is inhibited and, in the next step M52, all the switches for charging the batteries B1 and B2 are turned off. That is, the charging process is terminated at this step.

In step M53, "0000" is stored as output image data to indicate that the charging has been terminated, and all the LEDs are turned off (step M42). In step M55, determination is made as to whether or not flag FSET for indicating the attachment of the battery B2 is "1101". If YES, this step is repeated. If NO, the process proceeds to step M12 of checking the attachment of the battery B1.

If it is determined in step M32a that the battery B2 is not attached, the process proceeds to step M56 to store "1110" as flag FSET and to indicate that the battery B1 is attached.

Next, in step M57, "0010" is stored as flag FCHARGE and data denoting that the battery B1 is being tricklingly charged is stored. In step M58, the battery B1 trickle charging switch is turned on to start trickle charging of the battery B, and, in step M59 "1101" is stored as output image data to indicate that the battery B1 is being tricklingly charged. Also, the green LED for indicating trickle charging of the battery B1 is turned on (step M60) for indication of trickle charging of the battery B1.

The process then proceeds to step M61 to check whether or not flag FCHARGE has been changed into "011000". When trickle charging is terminated and when flag FCHARGE is changed into "0100", the process proceeds to step M63. If the flag is not changed, the process proceeds to step M62 as indicated by the arrow NO to determine whether or not attached state flag FSET is "1110" (whether or not the battery B1 is attached).

In step M63, timer interruption is inhibited and, in step M64, all the switches for charging the batteries B1 and B2 are turned off. That is, the charging process is terminated. In steps M65, M66, M67, the same post-charging processing as steps M53 to M55 is conducted.

In the case of "0000" (if the battery B2 is attached), the process proceeds to step M68 to tricklingly charge the battery B1 and to quickly charge the battery B2. Steps M68 to M77 are the same as steps M36 to M45. That is, in these steps, preparation of quick charging of the battery B2 is made and data denoting that the battery B1 is tricklingly charged while the battery B2 is quickly charged is stored.

Steps M78 to M87 correspond to steps M46 to M55. That is, the charging operation is changed over from quick charging to trickle charging. In this case, however, the battery B1 is also tricklingly charged and factors relating to the battery B1 are also included.

The processing of the main routine is thus conducted.

Figure 8:
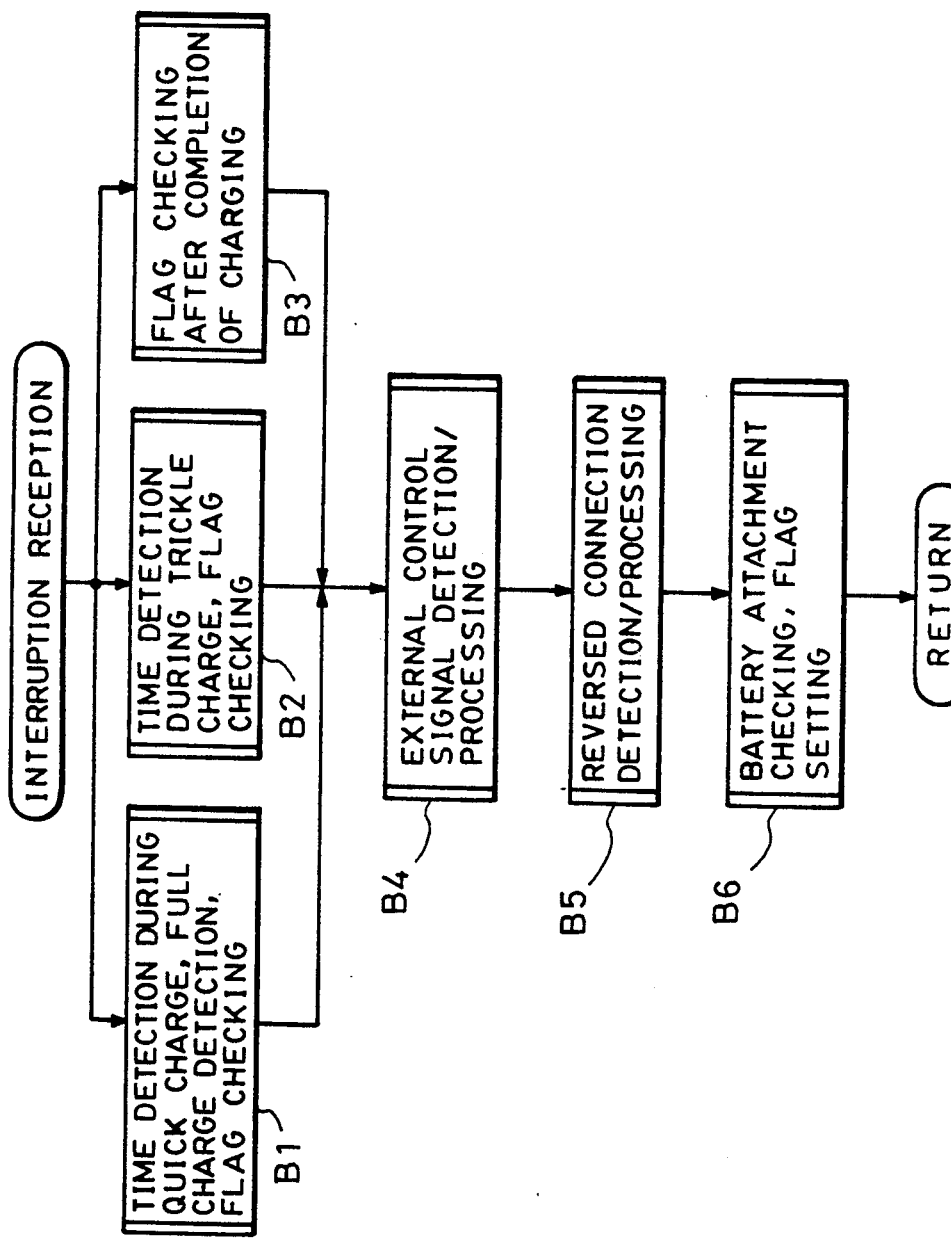
FIG. 8 is a schematic flow chart of the timer interruption routine.

The time interruption routine will be schematically described below with reference to FIG. 8. When the timer interruption is initiated, the present situation is discriminated by a step not shown in FIG. 8. The process proceeds to step B1 in case of quick charging, to step B2 in case of trickle charging or to step B3 if the charging processing is completed. In step B1, detection of time, detection of the fully charged state and flag checking during quick charging are effected. When trickle charging is being performed, time detection and flag checking during charging are effected. After the completion of charging, flag checking is effected. After these steps B1 to B3, processing of detecting external control signals is performed (step B4). In this step, a desired control signal is applied from outside to stop the charging process. If no external control signal is supplied, the process jumps this step. In the next step B5, reversed connection of the batteries is detected and relating processing is conducted. In a case where one of the batteries is connected in the reverse direction, there is a risk of the power source being broken by a current from the battery, and an alarm is therefore issued and charging is not started. In step B6, battery attachment checking and flag setting are performed. This step is repeated to update the contents of the registers and then the process returns.

The timer interruption routine will described below in more detail.

Figure 9:
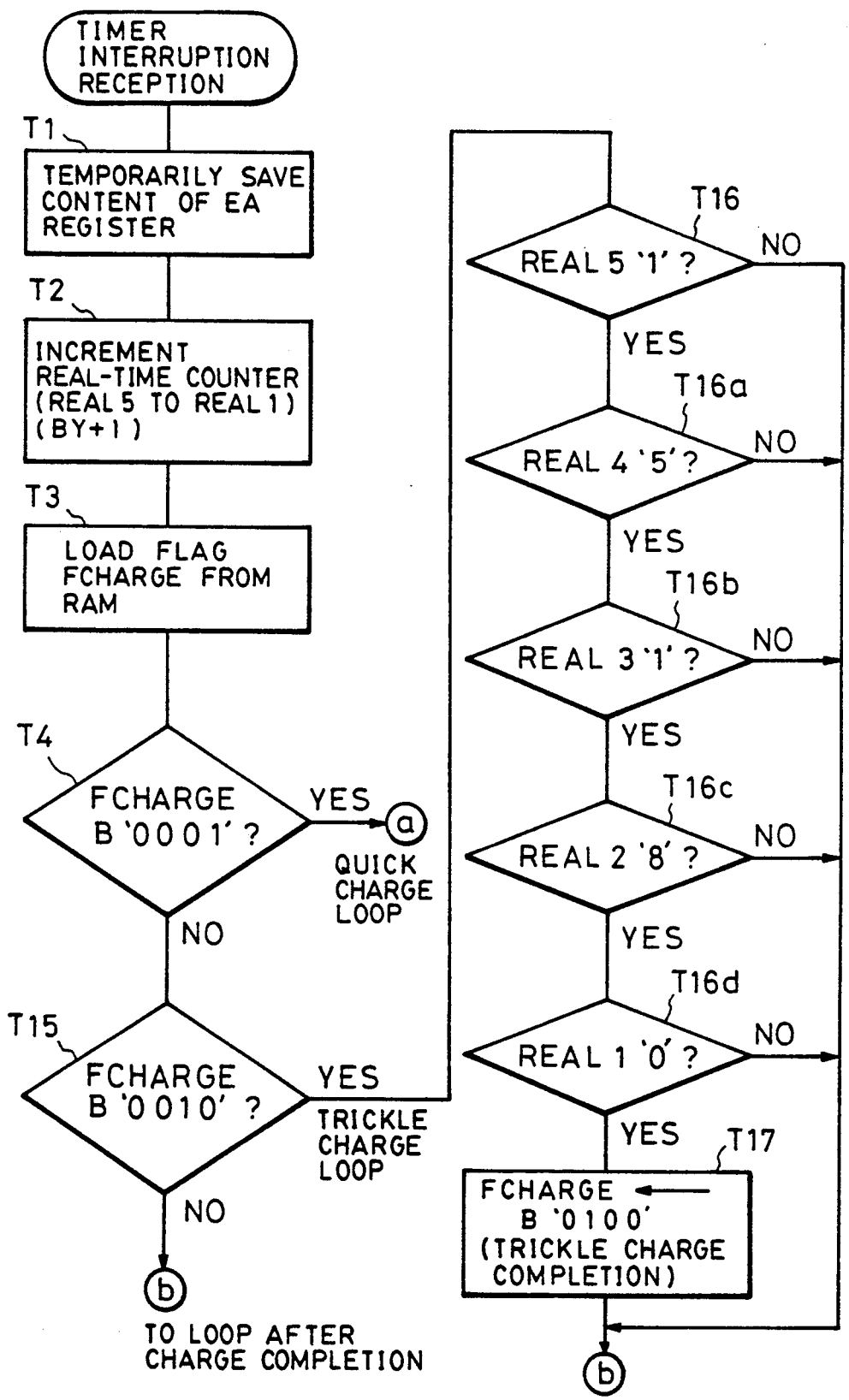
FIGS. 9(1) to 9(5) are flow charts of details of the timer interruption routine.
Figure 9:
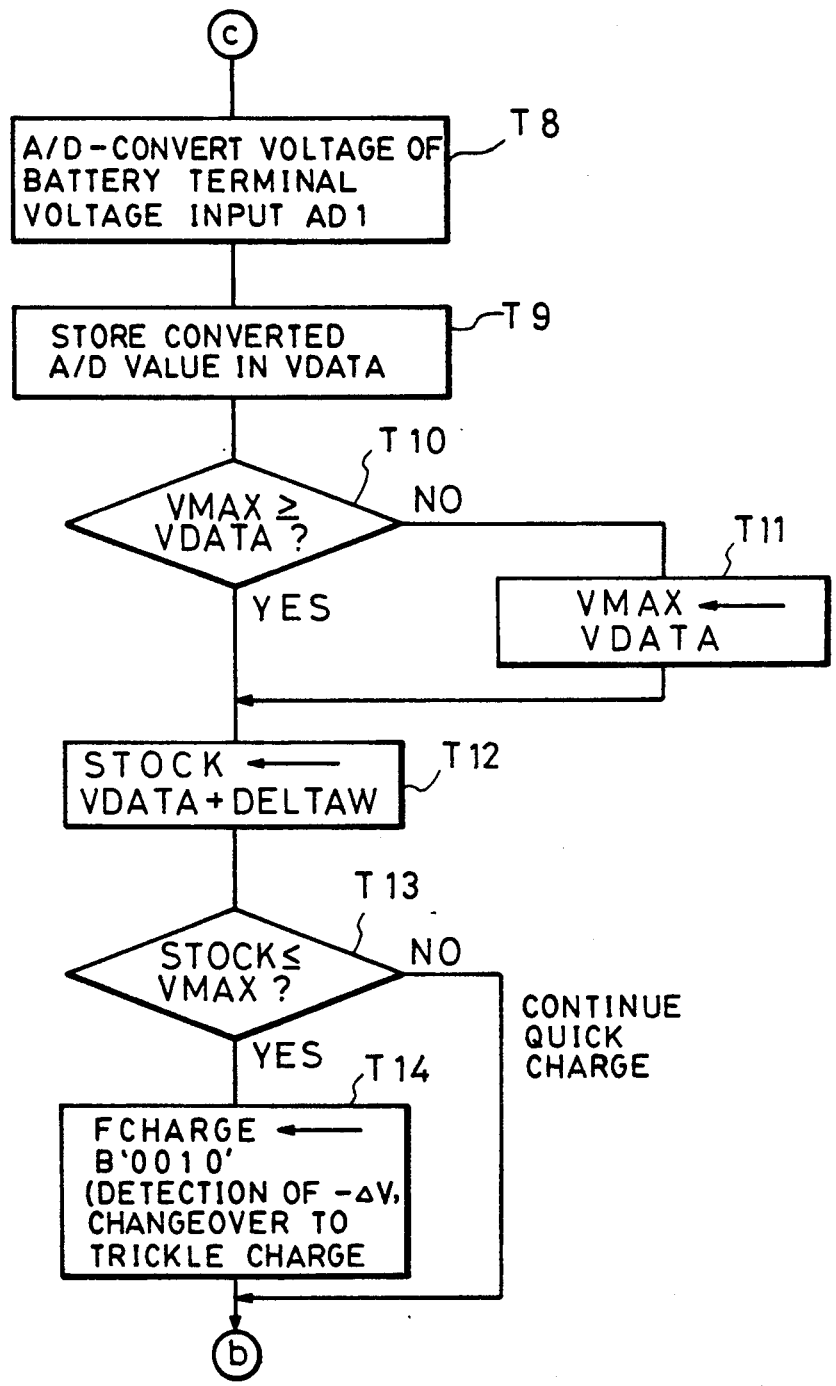
Figure 9:
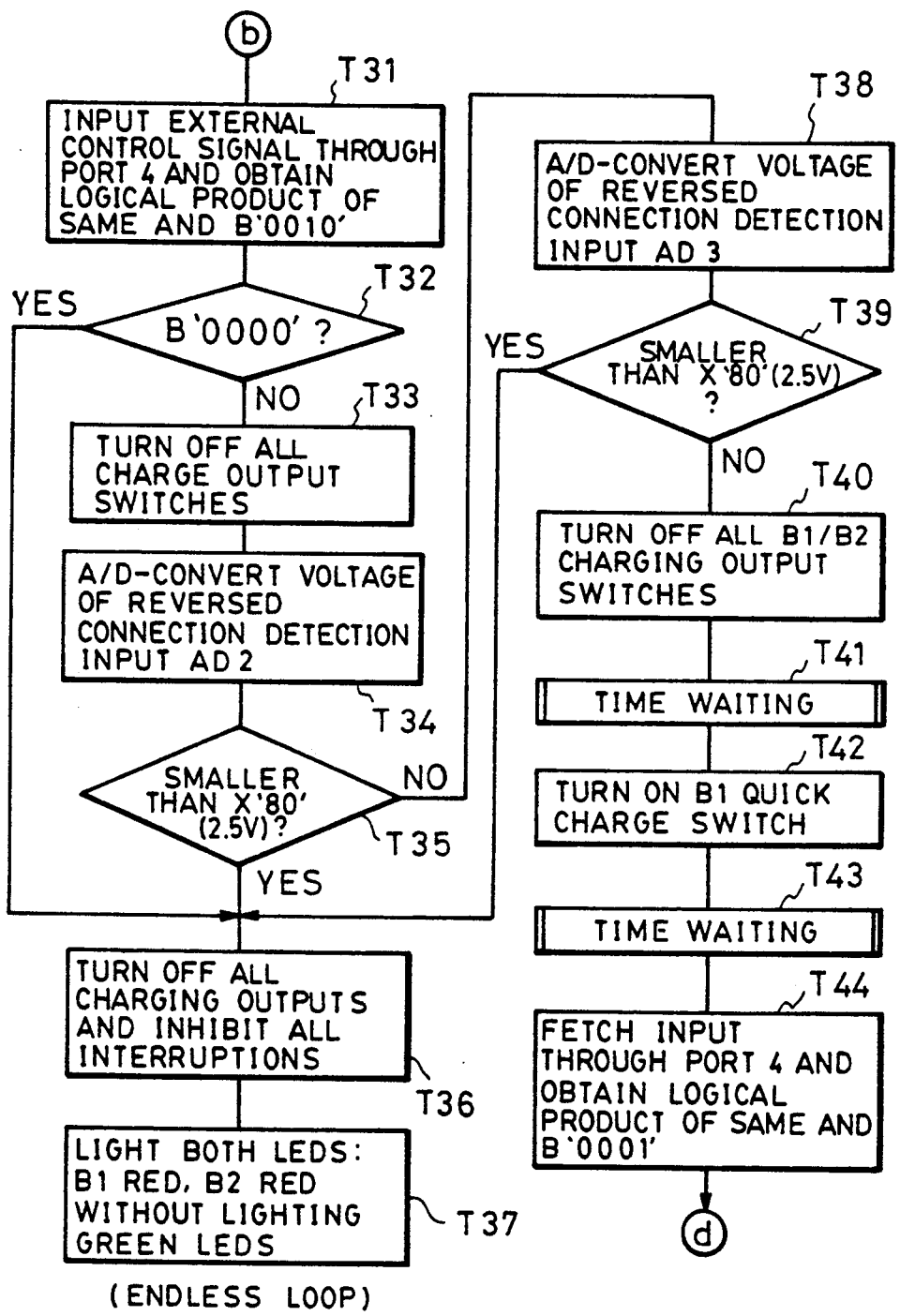
Figure 9:
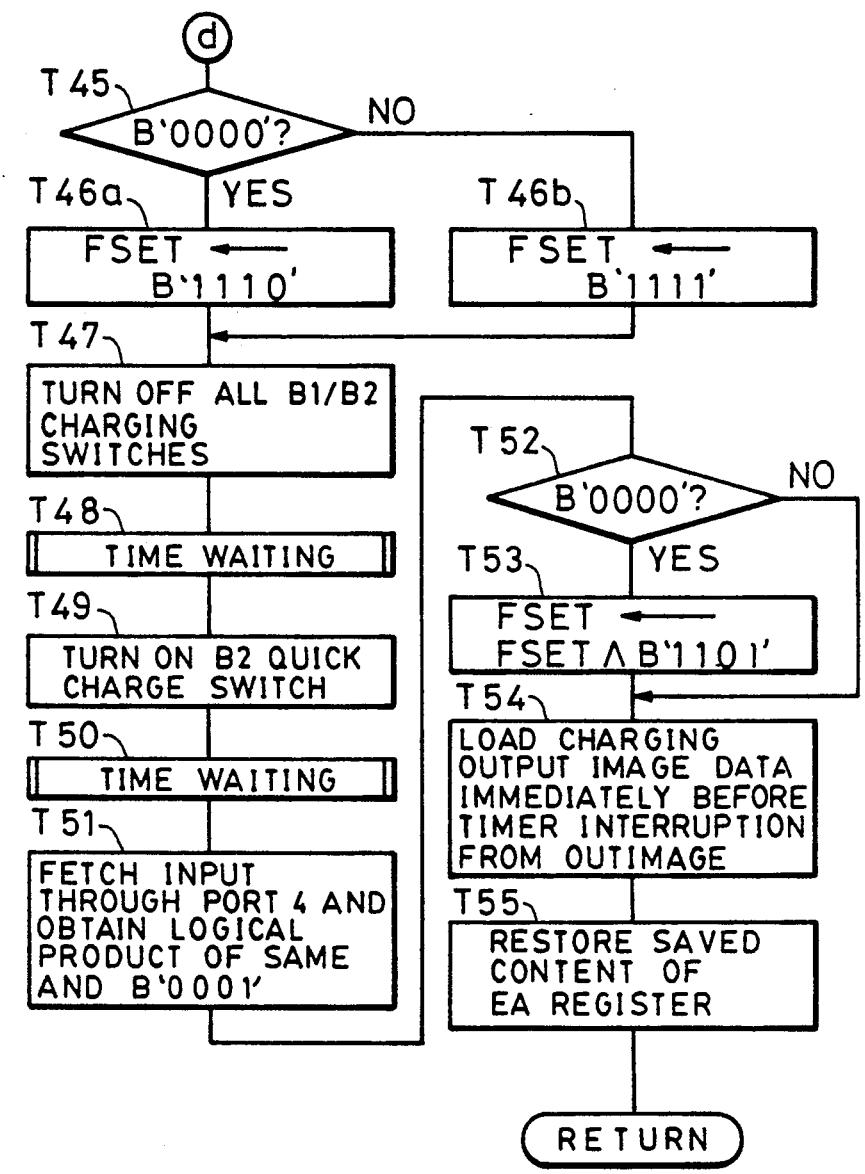

Details of the timer interruption routine will be described below with reference to FIG. 9. In this embodiment, timer interruption occurs at intervals of about 0.5 sec.

When timer interruption is accepted, the contents of operation registers E and A provided in the RAM are temporarily saved (step T1). Next, the content of the real-time counter (REAL) is incremented by one (step T2), and the content of flag FCHARGE is read out of the RAM for loading (step T3). Determination is made as to whether or not the content of flag FCHARGE is "0001" representing quick charging (step T4). In the case of "0001", the process proceeds to the quick charging loop.

In the quick charging loop, determination is made in step T5 as to whether or not the content of the real-time counter (REAL) is "00078" (corresponding to one minute). That is, a current is first caused to flow for one minute to determine whether or not the batteries are short-circuited. When the content of the real-time counter becomes "00078" (one minute), the voltage of short-circuit detection input ADO which is a binary signal is A/D-converted in step T18. Determination is made as to whether or not the value of this input is smaller than "80" (corresponding to 2.5 V) (step T19). That is, if 2.5 V is not reached by charging for one minute, it is determined that the batteries are short-circuited, and the process proceeds to step T20 and subsequent steps as indicated by the arrow YES to cope with this abnormal situation. That is, all the charging outputs are first shut off (step T20). Then all interruptions are inhibited (step T21) and both the red LEDs for the batteries B1 and B2 are turned on and off. At this time, both the green LEDs are turned off. By this indication, the operator is informed of the abnormality.

If the content of the real-time counter does not correspond to one minute and if the batteries are not short-circuited, the process proceeds to step T6 to determine whether or not the value of the real-time counter is greater than the value of the register FIRSTT storing the insensible time set at the initial stage of charging. That is, if the value of the insensible time is exceeded, the process proceeds to detect a fully charged state. If the value of the insensible time is not exceeded, occurrence of a peak is ignored.

When the value of the real-time counter exceeds that of the initial stage insensible time $t_1$, processing for detecting a fully charged state is performed. At this time, to cope with the problem of a situation such that a full charge peak is not exhibited in a case where the battery is deteriorated, the value of the real-time counter is checked as to whether or not it has reached to the value of the quick charge forcible termination time CHARGET (step T7). When the forcible termination time elapses, direction of $-\Delta V$ is stopped and the process proceeds to step T23 to terminate quick charging and to change over the charging operation to trickle charging. At this time, "0010" representing trickle charging is input as flag FCHARGE.

If the forcible termination time has not elapsed in step T7, the process proceeds to step T8 to A/D-convert the battery terminal voltage AD1 and to store the converted digital value in the register VDATA (step T9). Determination is made as to whether or not this voltage value VDATA is smaller than the maximum voltage VMAX (step T10). That is, it is determined that the voltage is reduced so that the voltage change is peaked, if VDATA is smaller than VMAX. When VDATA is greater than the maximum value VMAX presently determined, the voltage is still increasing, and a new voltage value is input as the maximum voltage value (step T11).

Full charge detection is effected as described below.

First, in step T12, the predetermined detection sensitivity DELTAW is added to the voltage value VDATA and the resulting value is input into the register STOCK. The value of STOCK and the maximum voltage VMAX is compared (step T13). If the maximum value VMAX is smaller, it is determined that a fully-charged state is not detected, and quick charging is continued.

When the maximum value VMAX is equal to or greater than the value of the register STOCK, it is determined that a fully-charged state has been detected, and the charging operation is changed over from quick charging to trickle charging. That is, a peak is recognized only after the voltage has dropped from the maximum value VMAX to an extent greater than the predetermined value DELTAW. In step T14, "0010" representing trickle charging is input as flag FCHARGE.

If the content of flag FCHARGE is not "0001" in step T4, that is, quick charging is not being performed, the process proceeds to step T15 to determine whether or not it is "0010" representing trickle charging. If it is not "0010", that is, either quick charging or trickle charging if not being performed, the process proceeds to the loop after the completion of charging.

If flag FCHARGE is "0010", that is, trickle charging is being performed, comparison between the real-time counter and the long-time timer for trickle charging is effected in the subsequent step T16. In this embodiment, "15180" is set in the long-time timer, and the value of the real-time counter is compared with this value (steps T16, T16a, T16b, T16c, T16d). When the value of the real-time counter becomes equal to the value set in the long-time timer, "0100" representing the completion of trickle charging is input as flag FCHARGE in the next step T17.

If in the above-described flow it is determined that trickle charging is being performed or has been completed, the process proceeds to step T31 to check external control input. That is, a signal is input through port 4 and a logical product of this input and "0010" is obtained to check the upper one of the lower two digits of the signal input through port 4. If this value is "0000", it is determined that there is an abnormality, and necessary processing is performed. If it is not "0000", the process proceeds to check reversed connection (step T32).

Reversed connection checking with respect to the battery B1 is performed as described below. First, all the charging output switches are turned off (step T33), the voltage of reversed connection detection input AD2 is A/D-converted (step T34), and determination is made as to whether or not the converted value is a low level indicating reversed connection (step T35). In the case of low level, there is a reversed connection, and the process proceeds to the step of indicating this abnormal condition.

If the battery B1 is not reversely connected, the process proceeds to step T38 to check whether or not the battery B2 is reversely connected, that is, the voltage of reversed connection detection input AD3 is A/D-converted (step T38) and determination is made as to whether or not the converted value is a low level indicating reversed connection (step T39). In the case of low level, the battery B2 is reversely connected, and the process proceeds to the step of indicating the abnormality.

When an external control signal is input or when the battery B1 or B2 is reversely connected, all the charging outputs are turned off and all interruptions are inhibited (step T36), and both the red LEDs for the batteries B1 and B2 are turned on and off to inform the operator of this situation (step T37).

If each of the batteries B1 and B2 is not reversely connected, the process proceeds to step T40 to check the attachment of the batteries B1 and B2. All the charging outputs are turned off and the lapse of a predetermined time is awaited (step T41) until a stabilized state is established. Thereafter, the quick charge switch for the battery B1 is turned on (step T42), the lapse of a predetermined time is awaited (step T43), a binary signal of discrimination of the charging current to the battery B1 is input through port 4, and a logical product of this input and "0001" is obtained to check the attachment of the battery B1. If a current flows through the battery, the input through port 4 is active, i.e., 0, and the logical product is "0000". That is, the result of determination in step T45 is YES, and "1110" denoting that the battery B1 is attached is input as flag FSET in the next step T46a. If no current flows through the battery B1, the result of determination in step T45 is NO, "1111" denoting that the battery is not attached is input as flag FSET in step T46b. Next, all the charging outputs to the batteries B1 and B2 are turned off again (step T47) and the lapse of a predetermined time is awaited (step T48) until a stabilized state is established. Thereafter, the attachment of the battery B2 is checked. That is, the quick charge switch for the battery B2 is turned on (step T49), a current is caused to flow for a certain period of time (step T50), a (binary) signal of discrimination of the current charging current to the battery B1 is input through port 4, and a logical product of this input and "0001" is obtained to discriminate the result (step T51). That is, determination is made in step T52 as to whether or not the result of discrimination is "0000". In the case of "0000", the current flows and the battery B2 is attached. Accordingly, "1100" or "1101" according to the attachment of the battery B1 is input as flag FSET (step T53). The battery attachment checking is thus performed.

Subsequently, in step T54, charging output image data immediately before the timer interruption is issued from OUTIMAGE for loading. Then, the contents of the registers E and A temporarily saved are restored (step T55) and the process returns.

The timer interruption routine is this executed.

The present invention has been described with respect to the preferred embodiment, but the present invention is not limited to the above-described system or process. Other various changes, improvements and combinations of elements are possible, as is apparent to those skilled in the art.

According to the present invention, as described above, various registers are provided in the RAM and the main routine and the timer interruption routine are combined, thereby making it possible to efficiently control the process of charging various types of batteries.

What is claimed is:

1. A controller for charging a battery comprising:

charging means for quick charging at least one battery;

discrimination means connected to said charging means and said at least one battery, said discrimination means for determining whether said quick charging is completed based on voltage between terminals of said at least one battery dropping a predetermined amount from a peak value, and for terminating a charging operation of said charging means in response to the result of said discrimination means that said quick charging is completed, said discrimination means including means for setting a desired period of insensible time in a memory means in response to an external signal, said insensible time being a period in which a discrimination operation of said discrimination means is inhibited and wherein said insensible time includes a possible event that said voltage between said terminals is peaked while said quick charging of said at least one battery is incomplete.

2. A controller for charging a battery comprising:

charging means for quick charging at least one battery;

discrimination means connected to said charging means and said at least one battery, said discrimination means for determining whether said quick charging is completed based on voltage between terminals of said at least one battery, and for terminating a charging operation of said charging means in response to the result of determining that said quick charging is completed;

first memory means for storing a period of insensible time during which discrimination operation of said discrimination means is inherited; and means for inhibiting said discrimination operation of said discrimination means during said insensible time according to data stored by said first memory means;

second memory means for storing a period of forcible termination time which determines forcible termination of said quick charging; and means for said forcible termination of said quick charging of said charging means according to data stored by said second memory means irrespective of said discrimination means when the time of said quick charging exceeds said forcible termination time.

3. A controller according to claim 2, wherein said discrimination means includes a means for setting said forcible termination time to a desired length in response to an external signal.

* * * * *